US011552714B2

(12) United States Patent
Shibahara et al.

(10) Patent No.: US 11,552,714 B2
(45) Date of Patent: *Jan. 10, 2023

(54) SIGNAL SEPARATING APPARATUS AND SIGNAL SEPARATING METHOD

(71) Applicant: NIPPON TELEGRAPH AND TELEPHONE CORPORATION, Tokyo (JP)

(72) Inventors: Kohki Shibahara, Yokosuka (JP); Takayuki Mizuno, Yokosuka (JP); Akira Isoda, Yokosuka (JP); Yutaka Miyamoto, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 17/197,754

(22) Filed: Mar. 10, 2021

(65) Prior Publication Data

US 2021/0218477 A1 Jul. 15, 2021

Related U.S. Application Data

(62) Division of application No. 16/492,917, filed as application No. PCT/JP2018/008953 on Mar. 8, 2018, now Pat. No. 10,985,846.

(30) Foreign Application Priority Data

Apr. 13, 2017 (JP) .............................. JP2017-079870

(51) Int. Cl.
*H04B 10/69* (2013.01)
*H04B 1/10* (2006.01)
(Continued)

(52) U.S. Cl.
CPC ....... *H04B 10/6971* (2013.01); *H04B 1/1027* (2013.01); *H04B 10/2581* (2013.01); *H04J 14/04* (2013.01); *H04J 14/06* (2013.01)

(58) Field of Classification Search
CPC ............................ H04B 10/6971; H04B 1/102
See application file for complete search history.

(56) References Cited

U.S. PATENT DOCUMENTS 5,566,209 A 10/1996 Forssen et al.
6,118,832 A 9/2000 Mayrargue et al.
(Continued)

OTHER PUBLICATIONS

G. D. Golden et al., "Detection algorithm and initial laboratory results using VBLAST space-time communication architecture", Electronics letters,1999, vol. 35, No. 1.
(Continued)

*Primary Examiner* — Tanya T Motsinger
(74) *Attorney, Agent, or Firm* — Harness, Dickey & Pierce, P.L.C.

(57) ABSTRACT

A signal receiving apparatus includes at least one signal separating apparatus that separates a specific signal from a plurality of received signals. Each of the at least one signal separating apparatus includes a spatial filtering unit that separates at least one equalized signal and a decision signal outputting unit that generates a first decision signal by deciding the equalized signal and outputs the generated first decision signal. The spatial filtering unit separates the at least one equalized signal by multiplying at least the plurality of received signals among the plurality of received signals and either the first decision signal output from the decision signal outputting unit or a second decision signal output from another signal separating apparatus by predetermined weighting coefficients.

7 Claims, 15 Drawing Sheets

(51) Int. Cl.
  *H04B 10/2581* (2013.01)
  *H04J 14/04* (2006.01)
  *H04J 14/06* (2006.01)

(56) References Cited

U.S. PATENT DOCUMENTS

| | | | |
|---|---|---|---|
| 6,240,098 B1 | 5/2001 | Thibault et al. | |
| 6,243,415 B1 | 6/2001 | Pipon et al. | |
| 7,580,453 B2* | 8/2009 | Chang | H04L 25/03019 375/232 |
| 11,233,568 B1* | 1/2022 | Oveis Gharan | H04B 10/677 |
| 11,361,398 B2* | 6/2022 | Lee | G06T 5/005 |
| 2003/0204380 A1 | 10/2003 | Dishman et al. | |
| 2003/0206640 A1 | 11/2003 | Malvar et al. | |
| 2005/0175081 A1* | 8/2005 | Zhidkov | H04L 1/006 375/232 |
| 2008/0102764 A1 | 5/2008 | Thornton et al. | |
| 2008/0240230 A1* | 10/2008 | Oxman | H04N 21/4622 375/240.01 |
| 2009/0129456 A1 | 5/2009 | Miyatani | |
| 2009/0207077 A1 | 8/2009 | Hwang et al. | |
| 2010/0117904 A1 | 5/2010 | Miyatani | |
| 2012/0147942 A1 | 6/2012 | Schlegel et al. | |
| 2015/0092831 A1 | 4/2015 | Lv | |
| 2016/0021556 A1 | 1/2016 | Sim et al. | |
| 2016/0330789 A1 | 11/2016 | Goto et al. | |
| 2018/0191382 A1 | 7/2018 | Pipon | |
| 2019/0065859 A1* | 2/2019 | Togashi | G08B 13/196 |
| 2020/0014469 A1* | 1/2020 | Shibahara | H04B 1/1027 |
| 2022/0173942 A1* | 6/2022 | Lee | H04L 25/03006 |
| 2022/0190894 A1* | 6/2022 | Kamiya | H04J 13/22 |

OTHER PUBLICATIONS

K. Shibahara et al., LDPC-Coded FMF Transmission Employing Unreplicated Successive Interference Cancellation for MDL-Impact Mitigation, 2017 European Conference on Optical Communication (ECOC), 2017.

K. Pham et al., Low-Complexity SIC Detection Algorithms for Multiple-Input Multilple-Output Systems, IEEE Transactions on Signal Processing, vol. 63, No. 17, 2015, pp. 4625 to 4633.

International Search Report (English and Japanese) issued in International Application No. PCT/JP2018/008953, dated Jun. 5, 2018; ISA/JP.

* cited by examiner

SIGNAL SEPARATING APPARATUS AND SIGNAL SEPARATING METHOD

CROSS-REFERENCE TO RELATED APPLICATIONS

This is a divisional of U.S. patent application Ser. No. 16/492,917 filed on Sep. 10, 2019. This application is a 371 U.S. National Phase of International Application No. PCT/JP2018/008953, filed on Mar. 8, 2018, which claims priority to Japanese Application No. 2017-079870, filed on Apr. 13 2017. The entire disclosures of the above applications are incorporated herein by reference.

TECHNICAL FIELD

The present invention relates to technology for separating signals.

BACKGROUND ART

With the recent spread of smartphones, high-definition moving-image service delivery, development of Internet of Things (IoT) services, and the like, communication traffic flowing through optical networks has increased year by year. In optical networks, an increasing communication traffic demand has been dealt with by an advanced functionality of optical communication system apparatuses installed at end stations of optical networks, the introduction of optical amplifiers and optical switches, and the like without changing the structure of optical fibers that serve as transmission paths.

Single mode fibers are used as optical fibers which are the backbone of current high-capacity optical networks, except for local networks for a short distance such as local area networks (LANs). A single mode fiber is a fiber having a single core that serves as a path of an optical signal within a cladding and configured to support only a single mode in a wavelength band such as a C band or an L band used in high-capacity optical networks. Thereby, a high-capacity optical network that stably transfers information at a rate of several terabits per second over a long distance is realized.

Also, digital coherent transmission technology in which digital signal processing technology is combined with coherent transmission/reception technology has already been introduced into 100 gigabit-class optical transmitting apparatuses. With the digital coherent transmission technology, it is possible to extract the information independently loaded on the amplitude and phase of an optical carrier and correct waveform distortion caused during transmission with high accuracy.

As a simple example, an example of polarization-division multiplexing optical transmission using two modes of orthogonal polarized waves in a single mode fiber is given. In the polarization-division multiplexing optical transmission, different pieces of information can be loaded on polarized waves in an orthogonal relationship. These polarized waves are mixed in the optical transmission path in a complex manner. Also, the orthogonal axes of these polarized-wave modes fluctuate at a high speed and thus it is generally difficult to perform tracking using optical devices. Therefore, a receiving apparatus that deals with a polarization diversity structure receives a mixed polarization-division multiplexed optical signal, converts the mixed polarization-division multiplexed optical signal into a digital signal, and separates the signals using digital signal processing. The above-described process can be modeled as a 2×2 multiple-input multiple-output (MIMO) system used in wireless communication systems. Information for each of the polarized waves is extracted from the separated signals and communication between optical signal transmitting/receiving apparatuses is established.

As another example, an example of mode-division multiplexing optical transmission using a plurality of modes in a multimode fiber is given. In mode-division multiplexing optical transmission, a plurality of modes can be excited also in a wavelength band such as a C band by broadening a core diameter as compared with that of a single mode fiber and different pieces of information can be loaded in the respective modes. Also in the case of mode-division multiplexing optical transmission, as in the case of polarization-division multiplexing optical transmission, mode-division multiplexed optical signals are mixed in a complex manner during propagation in a multimode fiber. A receiving apparatus that deals with the mode diversity structure receives the mixed mode-division multiplexed optical signal, converts the mixed mode-division multiplexed optical signal into a digital signal, and separates the signals using digital signal processing. The above-described process can be modeled as an $N_T \times N_R$ MIMO system. Here, $N_T$ denotes the number of optical signal transmitting apparatuses and $N_R$ denotes the number of optical signal receiving apparatuses. Both $N_T$ and $N_R$ are integers greater than or equal to 2. Also, the following description assumes that separate modulated signals are respectively transmitted from the optical signal transmitting apparatuses.

Next, a signal separation algorithm used by the optical signal receiving apparatus for digital signal processing of polarization-division multiplexing optical transmission or mode-division multiplexing optical transmission will be described. It is to be noted that, in the following description, a polarization mode in a single mode fiber and a spatial mode in a multimode fiber will be treated in the same way using the term "mode". Various signal separation algorithms have been proposed for wireless communication MIMO systems. For example, signal separation algorithms include spatial filtering, an interference canceler, maximum likelihood decoding, and the like. In general, the signal processing scale and the mode separation capability are in a trade-off relationship, and the mode separation capability is improved whereas the signal processing scale is increased in the above-described order. However, in optical communication systems, spatial filtering of linear processing has generally been used because the modulation rate of signals is very high as compared with that in wireless communication systems and the tracking characteristic for transmission path fluctuation and real-time processing are required. Assuming that a transmitted signal is x, a received signal is y, noise added to the signal is z, and a transmission path matrix is H, the relationship of Formula (1) holds therebetween.

[Formula 1]

$$y = Hx + z \qquad (1)$$

In the spatial filtering, an equalized signal x^ (^ is added above x) of the transmitted signal x is obtained by multiplying the received signal y by a separation matrix $W^T$. Here, the superscript T of W denotes transposition. In a minimum mean square error (MMSE) criterion, $W^T$ that satisfies Formula (2) is obtained.

[Formula 2]

$$W^T = \arg\min[|W^T y - x|^2] \qquad (2)$$

By solving Formula (2), Formula (3) is obtained as $W^T$.

[Formula 3]

$$W^T = H^H \left( HH^H + \frac{1}{\gamma}I \right)^{-1} \quad (3)$$

In Formula (3), I denotes a unit matrix, y denotes a signal-to-noise ratio (SNR), and the superscript H denotes a complex conjugate transpose. As shown in Formula (3), H is required to obtain $W^T$. Although H can also be obtained using a pilot signal or the like, a least mean square (LMS) method, a recursive least squares (RLS) method, a constant modulus algorithm (CMA) method, and the like for adaptively obtaining H are used in optical communication systems in consideration of the tracking characteristic for transmission path fluctuation and the sacrifice of a transmission rate. The equalized signal x^ is obtained as in Formula (4) using Formula (3).

[Formula 4]

$$\hat{x} = W^T y = H^H \left( HH^H + \frac{1}{\gamma}I \right)^{-1} (Hx + z) \quad (4)$$

With the spatial filtering of Formula (4), certain excellent results have been obtained particularly in polarization-division multiplexing optical communication systems. However, in an environment where the transmission path matrix H has non-unitarity and noise is large, the equalized signal x^ includes residual crosstalk from other modes. The non-unitarity here means that the relationship of Formula (5) is established with respect to H.

[Formula 5]

$$HH^H \neq I \quad (5)$$

The non-unitarity of the optical communication system results from the mode dependent gain of an optical amplifier, imperfection in an optical device, core axis deviation at a fusion point, and the like. These phenomena are known as polarization-dependent loss in the single mode fiber and are known as mode dependent loss in the multimode fiber. In the following description, these phenomena will be treated in the same manner using the Wan "mode dependent loss".

An interference canceler is a signal separation algorithm different from spatial filtering. Interference cancelers are divided into two types, a parallel interference canceler and a successive interference canceler. A successive interference canceler will be described below with reference to FIG. 17. A spatial filtering unit of a first successive interference canceler shown in FIG. 17 first detects a stream having the highest signal-to-interference-plus-noise ratio (SINR) from among received signal vectors. In order to determine the stream having the highest SINR, for example, a method using a pilot signal or a method for calculating an SINR directly from a transmission path matrix H and an SNR on the basis of Formula (6) may be used.

[Formula 6]

$$\rho_i = \frac{1}{(i, i)^{th} \text{ component of } \left( H^H H + \frac{1}{\gamma}I \right)^{-1}} - 1 \quad (6)$$

In Formula (6), $\rho_i$ is an SINR of an $i^{th}$ stream. In the following description, components of the received signal y are assumed to be sorted in descending order of SINR for simplicity. That is, a description will be given on the assumption that the SINR of the first stream is highest. The first stream is detected as shown in Formula (7).

[Formula 7]

$$\widehat{x_1} = w_1^T y \quad (7)$$

In Formula (7), $w^T_i$ denotes a row vector of an $i^{th}$ row of $w^T$. A temporary decision signal outputting unit of the first successive interference canceler decides an equalized signal $x_1\hat{}$ (^ is added above $x_1$) obtained by the spatial filtering unit and outputs $x_1^-$ (– is added above $x_1$). Thereafter, a multiplier of the first successive interference canceler multiplies $x_1^-$ by a first column vector $h_1$ of H obtained by a transmission path matrix estimating unit, and a multiplication result of $h_1 x_1^-$ is input to a second successive interference canceler.

The second successive interference canceler detects a stream having the second highest SINR. Specifically, the second successive interference canceler subtracts the component $h_1 x_1^-$ derived from the first stream signal from the received signal y as shown in the following Formula (8).

[Formula 8]

$$y \leftarrow y - h_1 \overline{x_1} \quad (8)$$

Also, the second successive interference canceler reconstructs H with $(N_T-1)$ column vectors obtained by excluding the first column vector from H as shown in Formula (9).

[Formula 9]

$$H \leftarrow [h_2 \ h_3 \ldots h_{N_T}] \quad (9)$$

The detection of the stream is performed on the basis of Formula (7) by newly obtaining a separation matrix $w^T$ using H obtained by Formula (9). In this way, in the successive interference cancelers after the second successive interference canceler, the interference cancellation shown in Formula (8), the reconstruction of H shown in Formula (9), and the detection of the stream are sequentially performed. This process is continued until the last $N_T^{th}$ stream is detected.

PRIOR ART DOCUMENT

Non-Patent Document

Non-Patent Document 1: G. D. Golden, C. J. Foschini, R. A. Valenzuela, and P. W. Wolniansk, "Detection algorithm and initial laboratory results using V-BLAST space-time communication architecture", Electronics letters, 1999, Vol. 35, No. 1

SUMMARY OF INVENTION

Problems to be Solved by the Invention

With the successive interference cancelers, a space diversity effect can be obtained because the number of streams included in the received signal decreases toward the successive interference cancelers at subsequent stages. Thus, high signal separation performance can be obtained as compared with spatial filtering. However, the successive interference cancelers require the generation of the transmission path matrix H in order to generate a replica signal. As described above, an adaptive algorithm such as an LMS method, an RLS method, or a CMA method is generally used in optical communication systems in order to estimate the separation matrix $w^T$. If H is estimated, there is a concern that the characteristics of the successive interference cancelers may be degraded due to the sacrifice of the transmission rate and/or the deterioration in the accuracy of generation of the replica signal due to the estimation error of H. Furthermore, considering an optical communication system configured to perform coherent transmission and reception, phase noise and/or frequency offset are superimposed on the received signal, which may also lead to deterioration in the accuracy of generation of the replica signal.

In summary, in spatial filtering, an influence of mode dependent loss appears as SNR degradation and residual inter-mode crosstalk, and the SNR degradation and the residual inter-mode crosstalk cannot be completely eliminated. In the successive interference cancelers, it is necessary to separately estimate a transmission path matrix, phase noise, frequency offset, and the like, and there is a problem that the signal separation performance is degraded depending on the estimation accuracy. Because the mode-dependent loss increases as the transmission distance of the optical signal increases, this becomes a major factor that disturbs the long-distance transmission in optical communication systems.

In view of the above-described circumstances, an object of the present invention is to provide technology capable of separating multiplexed signals with high accuracy.

Means for Solving the Problems

An aspect of the present invention is a signal receiving apparatus including: at least one signal separating apparatus that separates a specific signal from a plurality of received signals, wherein each of the at least one signal separating apparatus includes: a spatial filtering unit that separates at least one equalized signal; and a decision signal outputting unit that generates a first decision signal by deciding the equalized signal and outputs the generated first decision signal, and the spatial filtering unit separates the at least one equalized signal by multiplying at least the plurality of received signals among the plurality of received signals and either the first decision signal output from the decision signal outputting unit or a second decision signal output from another signal separating apparatus by predetermined weighting coefficients.

In the above-described signal receiving apparatus, the at least one signal separating apparatus may be a plurality of signal separating apparatuses, the spatial filtering unit may separate a single equalized signal as the at least one equalized signal by multiplying at least the plurality of received signals among the plurality of received signals and the second decision signal by the predetermined weighting coefficients, the decision signal outputting unit may be a temporary decision signal outputting unit that generates a temporary decision signal representing a signal that is likely as the equalized signal, as the first decision signal, and the spatial filtering unit of a $k^{th}$ (k is an integer greater than or equal to 2) signal separating apparatus may input a total of $(N_R+k-1)$ signals including $N_R$ ($N_R$ is an integer greater than or equal to 2) received signals, which are the plurality of received signals, and (k−1) temporary decision signals serving as the second decision signal obtained from first to $(k-1)^{th}$ signal separating apparatuses and separate a signal k from the plurality of received signals.

In the above-described signal receiving apparatus, the at least one signal separating apparatus may be a plurality of signal separating apparatuses, the spatial filtering unit may separate a plurality of equalized signals as the at least one equalized signal by multiplying at least the plurality of received signals among the plurality of received signals and the second decision signal by the predetermined weighting coefficients, and the spatial filtering unit of a $k^{th}$ (k is an integer greater than or equal to 2) signal separating apparatus may input $N_R$ ($N_R$ is an integer greater than or equal to 2) received signals, which are the plurality of received signals, input the first decision signal generated by the decision signal outputting unit of a $(k-1)^{th}$ signal separating apparatus as the second decision signal, and separate the specific signal from the plurality of received signals.

In the above-described signal receiving apparatus, the decision signal outputting unit may be a temporary decision signal outputting unit that generates a temporary decision signal representing a signal that is likely as the equalized signal, as the first decision signal.

In the above-described signal receiving apparatus, the decision signal outputting unit may be a soft decision signal outputting unit that calculates likelihood information of transmitted signal information and generates a soft decision symbol on the basis of the likelihood information as the first decision signal.

In the above-described signal receiving apparatus, the at least one signal separating apparatus may be a single signal separating apparatus, the decision signal outputting unit may output the first decision signal to the spatial filtering unit, the spatial filtering unit may separate a plurality of equalized signals as the at least one equalized signal by multiplying at least the plurality of received signals among the plurality of received signals and the first decision signal output from the decision signal outputting unit by the predetermined weighting coefficients, and the decision signal outputting unit may output the first decision signal as the specific signal when the first decision signal is generated a predetermined number of times for the plurality of received signals.

In the above-described signal receiving apparatus, the decision signal outputting unit may include an error correction decoding unit.

The above-described signal receiving apparatus may further include a phase noise estimating unit that estimates phase noise of the at least one equalized signal on the basis of the at least one equalized signal output by the spatial filtering unit and outputs the estimated phase noise.

In the above-described signal receiving apparatus, the spatial filtering unit may include: a first multiplying unit that multiplies the plurality of received signals by coefficients; a second multiplying unit that multiplies the first decision signal or the second decision signal by a coefficient; a third multiplying unit that multiplies the phase noise output from the phase noise estimating unit by an output of the first multiplying unit; and an addition unit that sums an output of the second multiplying unit and an output of the third multiplying unit.

In the above-described signal receiving apparatus, the spatial filtering unit may include: a phase correcting unit that multiplies the phase noise output from the phase noise estimating unit by the first decision signal or the second decision signal; and a coefficient multiplying unit that multiplies the plurality of received signals and an output signal of the phase correcting unit by coefficients.

An aspect of the present invention is a signal separating method including: a spatial filtering step in which each of at least one signal separating apparatus that separates a specific signal from a plurality of received signals separates at least one equalized signal; and a decision signal outputting step of generating a first decision signal by deciding the equalized signal and outputting the generated first decision signal, wherein the spatial filtering step separates the at least one equalized signal by multiplying at least the plurality of received signals among the plurality of received signals and either the first decision signal output in the decision signal outputting step or a second decision signal output from another signal separating apparatus by predetermined weighting coefficients.

Advantageous Effects of the Invention

According to the present invention, it is possible to separate multiplexed signals with high accuracy.

MODES FOR CARRYING OUT THE INVENTION

Hereinafter, embodiments of the present invention will be described with reference to the drawings.

Figure 1:
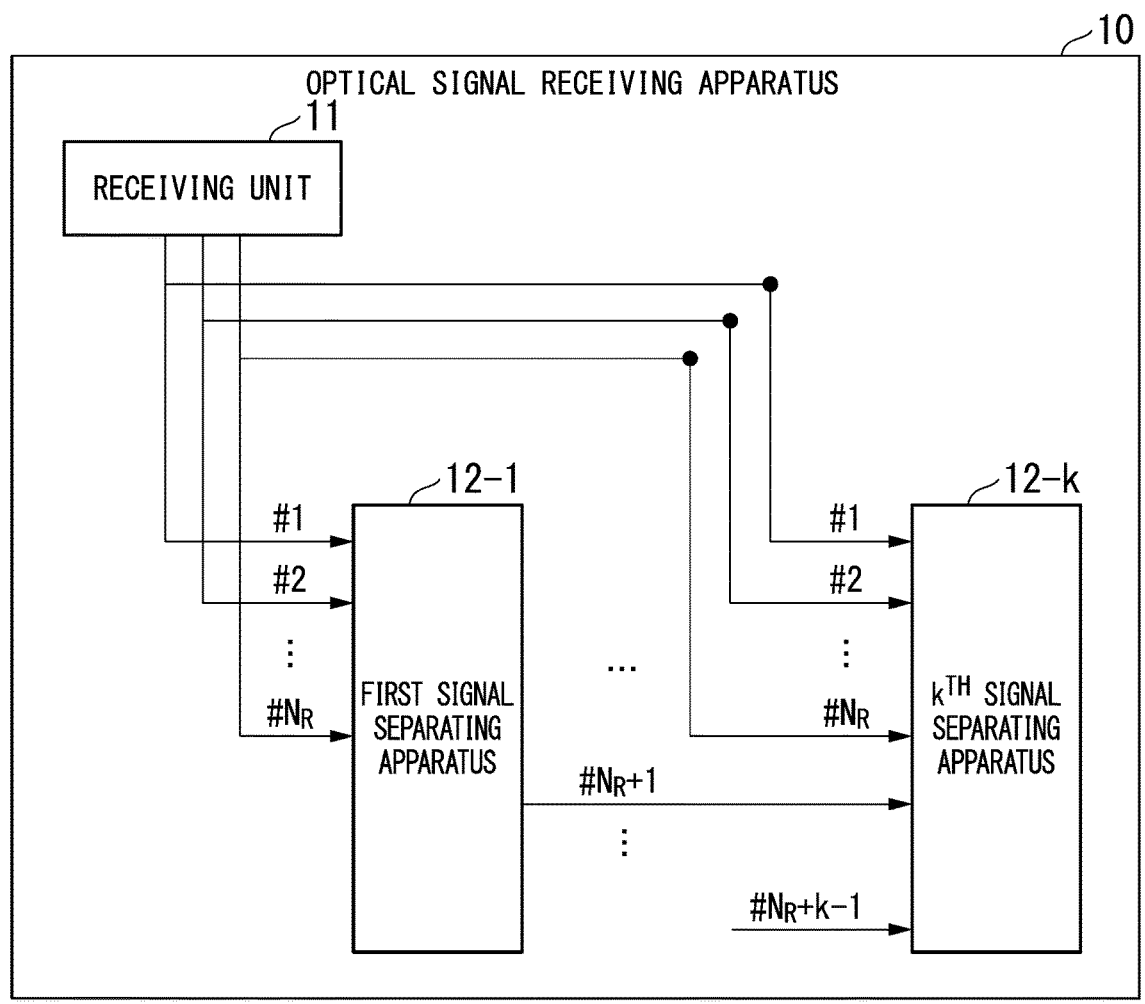
FIG. 1 is a block diagram of an optical signal receiving apparatus 10 in first to fourth embodiments of the present invention.

FIG. 1 is a block diagram of an optical signal receiving apparatus 10 in first to fourth embodiments of the present invention. The optical signal receiving apparatus 10 includes a receiving unit 11 and first to $k^{th}$ signal separating apparatuses 12-1 to 12-$k$ ($k$ is an integer greater than or equal to 2). It is to be noted that, in the following description, the first to $k^{th}$ signal separating apparatuses 12-1 to 12-$k$ will be simply referred to as signal separating apparatuses 12 when there is no particular need to distinguish them.

The receiving unit 11 receives signals transmitted from an optical signal transmitting apparatus (not shown). For example, the receiving unit 11 receives $N_R$ ($N_R$ is an integer greater than or equal to 2) signals. The receiving unit 11 outputs the $N_R$ received signals to each of the signal separating apparatuses 12.

The signal separating apparatuses 12 separate the input received signals. For example, the first signal separating apparatus 12-1 separates a single signal from the $N_R$ input signals. The first signal separating apparatus 12-1 outputs a signal obtained from the separated signal to the $k^{th}$ signal separating apparatus 12-$k$ ($N_R$+1 in FIG. 1). The $k^{th}$ signal separating apparatus 12-$k$ inputs a total of ($N_R$+$k$−1) signals including the $N_R$ signals and ($k$−1) signals obtained from the first to $(k-1)^{th}$ signal separating apparatuses 12 and separates a signal $k$ from the received signals. It is to be noted that although the $k^{th}$ signal separating apparatus 12-$k$ has been described here, a description similar to that for the $k^{th}$ signal separating apparatus 12-$k$ is applied to the case in which there is a signal separating apparatus (herein referred to as a $j^{th}$ signal separating apparatus (1<j<k)) located between the first signal separating apparatus 12-1 and the $k^{th}$ signal separating apparatus 12-$k$ (the same is true for the first to fourth embodiments described below). That is, the $j^{th}$ signal separating apparatus 12-$j$ inputs a total of ($N_R$+$j$−1) signals including the $N_R$ signals and ($j$−1) signals obtained from the first to $(j-1)^{th}$ signal separating apparatuses and separates a signal $j$ from the received signals.

Hereinafter, details of the signal separating apparatuses will be described.

First Embodiment

Figure 2:
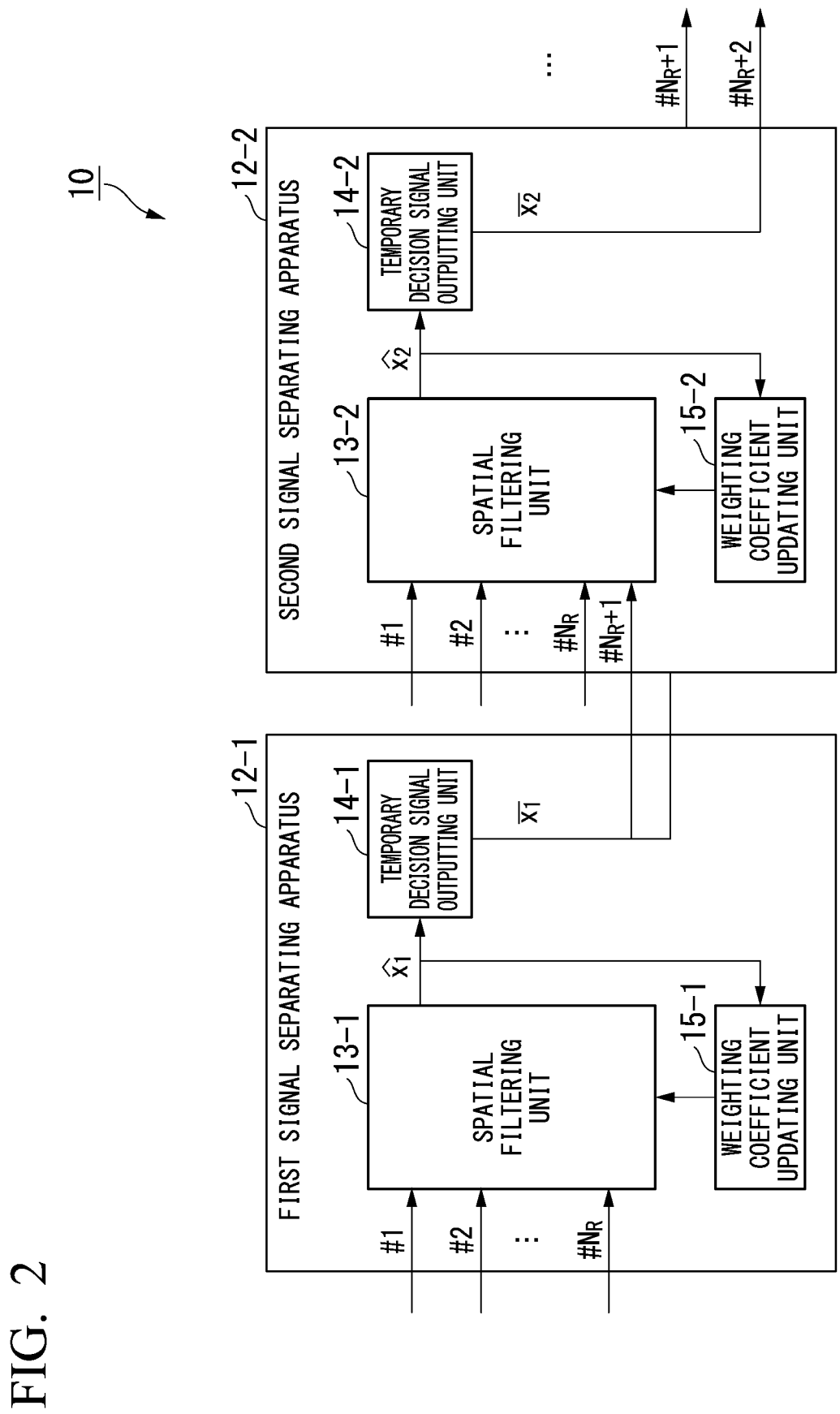
FIG. 2 is a schematic block diagram showing a functional configuration of the optical signal receiving apparatus 10 in the first embodiment.

FIG. 2 is a schematic block diagram showing a functional configuration of the optical signal receiving apparatus 10 in the first embodiment. It is to be noted that the illustration of the receiving unit 11 is omitted in FIG. 2 (the same is also true for the drawings subsequent to FIG. 2). In FIG. 2, a process of the signal separating apparatus 12 will be described using the first signal separating apparatus 12-1 and the second signal separating apparatus 12-2 among the signal separating apparatuses 12 provided in the optical signal receiving apparatus 10. It is to be noted that, for simplification of the description, the present embodiment will be described on the assumption that components of a received signal y (i.e., $N_R$ received signals) are sorted in descending order of SINR.

First, the configuration of the first signal separating apparatus 12-1 will be described. The first signal separating apparatus 12-1 includes a spatial filtering unit 13-1, a temporary decision signal outputting unit 14-1, and a weighting coefficient updating unit 15-1.

The spatial filtering unit 13-1 inputs the $N_R$ signals output from the receiving unit 11, and separates an equalized signal by multiplying the $N_R$ input signals by weighting coefficients. The weighting coefficients are coefficients used for signal separation, and initial values thereof may be preset values or may be zero. It is to be noted that the weighting coefficients are updated every time the process is performed. The equalized signal separated by the process of the spatial filtering unit 13-1 is denoted as $x_1\hat{}$.

The temporary decision signal outputting unit 14-1 inputs the equalized signal $x_1\hat{}$ obtained by the process of the spatial filtering unit 13-1, decides the input equalized signal $x_1\hat{}$, and outputs a decision result as a first temporary decision signal $x_1^-$ to the second signal separating apparatus 12-2.

The weighting coefficient updating unit 15-1 inputs the equalized signal $x_1\hat{}$ obtained by the process of the spatial filtering unit 13-1 and updates weighting coefficients $w^T_1$ on the basis of the input equalized signal $x_1\hat{}$. In the following description, the weighting coefficients $w^T_1$ updated by the weighting coefficient updating unit 15-1 will be referred to as first weighting coefficients.

Next, a configuration of the second signal separating apparatus 12-2 will be described. The second signal separating apparatus 12-2 includes a spatial filtering unit 13-2, a temporary decision signal outputting unit 14-2, and a weighting coefficient updating unit 15-2.

The spatial filtering unit 13-2 inputs a total of $(N_R+1)$ signals including the $N_R$ signals output from the receiving unit 11 and the first temporary decision signal $x_1^-$ output from the first signal separating apparatus 12-1 and separates an equalized signal by multiplying the $(N_R+1)$ input signals by a weighting coefficient vector. The equalized signal separated by the process of the spatial filtering unit 13-2 is denoted as $x_2\hat{}$.

The temporary decision signal outputting unit 14-2 inputs the equalized signal $x_2\hat{}$ obtained by the process of the spatial filtering unit 13-2, decides the input equalized signal $x_2\hat{}$, and outputs a second temporary decision signal $x_2^-$ that is a decision result to the signal separating apparatus 12 at the subsequent stage.

The weighting coefficient updating unit 15-2 inputs the equalized signal $x_2\hat{}$ obtained by the process of the spatial filtering unit 13-2 and updates weighting coefficient $w^T_2$ on the basis of the input equalized signal $x_2\hat{}$. In the following description, the weighting coefficient $w^T_2$ updated by the weighting coefficient updating unit 15-2 will be referred to as second weighting coefficients.

Figure 3:
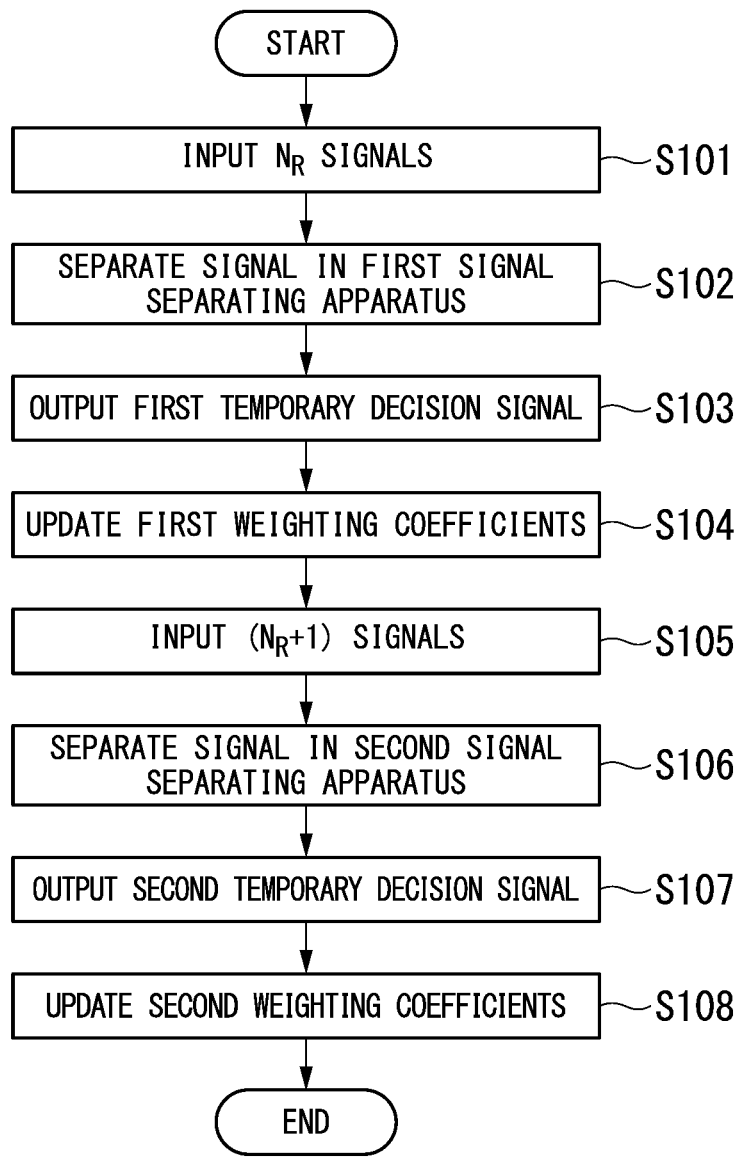
FIG. 3 is a flowchart showing a flow of a process of the optical signal receiving apparatus 10 in the first embodiment.

FIG. 3 is a flowchart showing a flow of a process of the optical signal receiving apparatus 10 in the first embodiment. It is to be noted that, FIG. 3 describes the process of the signal separating apparatus 12 using the first signal separating apparatus 12-1 and the second signal separating apparatus 12-2 among the signal separating apparatuses 12 provided in the optical signal receiving apparatus 10.

The spatial filtering unit 13-1 inputs the $N_R$ signals output from the receiving unit 11 (step S101). The spatial filtering unit 13-1 separates the equalized signal by multiplying the $N_R$ input signals by the first weighting coefficients $w^T_1$ output from the weighting coefficient updating unit 15-1 (step S102). The spatial filtering unit 13-1 outputs the separated equalized signal $x_1\hat{}$ to the temporary decision signal outputting unit 14-1.

The temporary decision signal outputting unit 14-1 inputs the equalized signal $x_1\hat{}$ output from the spatial filtering unit 13-1. The temporary decision signal outputting unit 14-1 decides the input equalized signal $x_1\hat{}$ and outputs a decision result as the first temporary decision signal $x_1^-$ to the second signal separating apparatus 12-2 (step S103). Here, a decision process means a process of deciding a signal likely as an equalized signal. Here, an example of the decision process will be described. The decision of $x_1\hat{}$ is considered using a quadrature phase shift keying (QPSK) modulation signal. $x_1\hat{}$ can be divided into a real component $x_{r1}\hat{}$ and an imaginary component $x_{i1}\hat{}$ as follows.

$$x_1\hat{} = x_{r1}\hat{} + 1j * x_{i1}\hat{}$$

It is only necessary to decide $x_{r1}\hat{}$ and $x_{i1}\hat{}$ in order to decide $x_1\hat{}$. Assuming that mark rates of all QPSK modulation signals are equal for all the symbols under white noise, an identification point for $x_{r1}\hat{}$ is zero. That is, it is decided to be 1 (or 0) if $x_{r1}\hat{} > 0$ or $x_{r1}\hat{} = 0$ and it is decided to be 0 (or 1) if $x_{r1}\hat{} > 0$. Likewise, it is decided to be 1 (or 0) if $x_{i1}\hat{} > 0$ and it is decided to be 0 (or 1) if $x_{i1}\hat{} < 0$ or $x_{i1}\hat{} = 0$. One bit is decided for each of $x_{r1}\hat{}$ and $x_{i1}\hat{}$, and a total of 2 bits are output as the first temporary decision signal $x_1^-$ which is a temporary decision result.

Also, the weighting coefficient updating unit 15-1 inputs the equalized signal $x_1\hat{}$ output from the spatial filtering unit 13-1. The weighting coefficient updating unit 15-1 updates the first weighting coefficients $w^T_1$ using an adaptive algorithm such as an LMS method, an RLS method, or a CMA method and the input equalized signal $x_1\hat{}$ (step S104). For example, when the LMS method is used, the weighting coefficient updating unit 15-1 updates the first weighting coefficients $w^T_1$ as shown in the following Formula (10) with an error $e_1$ and a step size parameter $\mu$.

[Formula 10]

$$w_1^T \leftarrow w_1^T + \mu e_1 y^* \qquad (10)$$

It is to be noted that * denotes a complex conjugate signal.

The spatial filtering unit 13-2 inputs a total of $(N_R+1)$ signals including the $N_R$ signals output from the receiving unit 11 and the first temporary decision signal $x_1^-$ output from the first signal separating apparatus 12-1 (step S105). The spatial filtering unit 13-2 separates an equalized signal by multiplying the $(N_R+1)$ input signals by the second weighting coefficients $w^T_2$ output from the weighting coefficient updating unit 15-2 (step S106). The spatial filtering unit 13-2 outputs the separated equalized signal $x_2\hat{}$ to the temporary decision signal outputting unit 14-2.

The temporary decision signal outputting unit 14-2 inputs the equalized signal $x_2\hat{}$ output from the spatial filtering unit 13-2. The temporary decision signal outputting unit 14-2 decides the input equalized signal $x_2\hat{}$ and outputs the decision result as a second temporary decision signal $x_2^-$ to a signal separating apparatus 12 at the subsequent stage (step S107). Also, the weighting coefficient updating unit 15-2 inputs the equalized signal $x_2^{\wedge}$ output from the spatial filtering unit 13-2. The weighting coefficient updating unit 15-2 updates the second weighting coefficients $w^T{}_2$ using an adaptive algorithm such as an LMS method, an RLS method, or a CMA method and the input equalized signal $x_2^{\wedge}$ (step S108). For example, the weighting coefficient updating unit 15-2 updates the second weighting coefficients $w^T{}_2$ as shown in the following Formula (11) with an error $e_2$.

[Formula 11]

$$w_2^T \leftarrow w_2^T + \mu e_2 [y^*; \overline{x_1}^*] \tag{11}$$

It is to be noted that although the description has been given using two signal separating apparatuses 12 in FIGS. 2 and 3, a total of ($N_R$+2) signals including the $N_R$ signals output from the receiving unit 11, the first temporary decision signal $x_1^-$ output from the first signal separating apparatus 12-1, and the second temporary decision signal $x_2^-$ output from the second signal separating apparatus 12-2 are input to the third signal separating apparatus 12-3. In this way, in the $k^{th}$ signal separating apparatus 12-$k$ in the present embodiment, the spatial filtering unit 13 inputs a signal having a total of ($N_R$+k−1) components including (k−1) signal components separated and decided by the first to (k−1)$^{th}$ signal separating apparatuses 12-1 to 12-($k$−1) and the $N_R$ signals output from the receiving unit 11, and a signal k is separated.

With the optical signal receiving apparatus 10 configured as described above, a (k−1)$^{th}$ temporary decision signal $x_{(k-1)}^-$ generated from the signal extracted by the (k−1)$^{th}$ signal separating apparatus 12-($k$−1) at the previous stage is additionally supplied to the spatial filtering unit 13-$k$ of the $k^{th}$ signal separation apparatus 12-$k$ at the subsequent stage. That is, the spatial filtering unit 13-$k$ of the $k^{th}$ signal separating apparatus 12-$k$ inputs a signal vector having a total of ($N_R$+k−1) components including $N_R$ received signals and (k−1) signal components decided by the first to (k−1)$^{th}$ signal separating apparatuses 12-1 to 12-($k$−1) and separates a signal k. Thus, it becomes possible to separate multiplexed signals with high accuracy.

Also, the signal detection performance of the successive interference canceler significantly depends on the accuracy in generation of the replica signal. When a successive interference canceler of the conventional configuration is applied to optical communication, it is necessary to obtain changes in a phase and amplitude in a propagation path, i.e., channel information, with high accuracy before an input of the spatial filtering unit 13-1 in order to improve the accuracy in generation of the replica signal. With the configuration of the present embodiment, weighting coefficients for interference components of any stream included in each received signal are adaptively adjusted in the weighting coefficient updating unit and thus it becomes unnecessary to estimate channel information in advance and the interference components can be removed.

Second Embodiment

Figure 4:
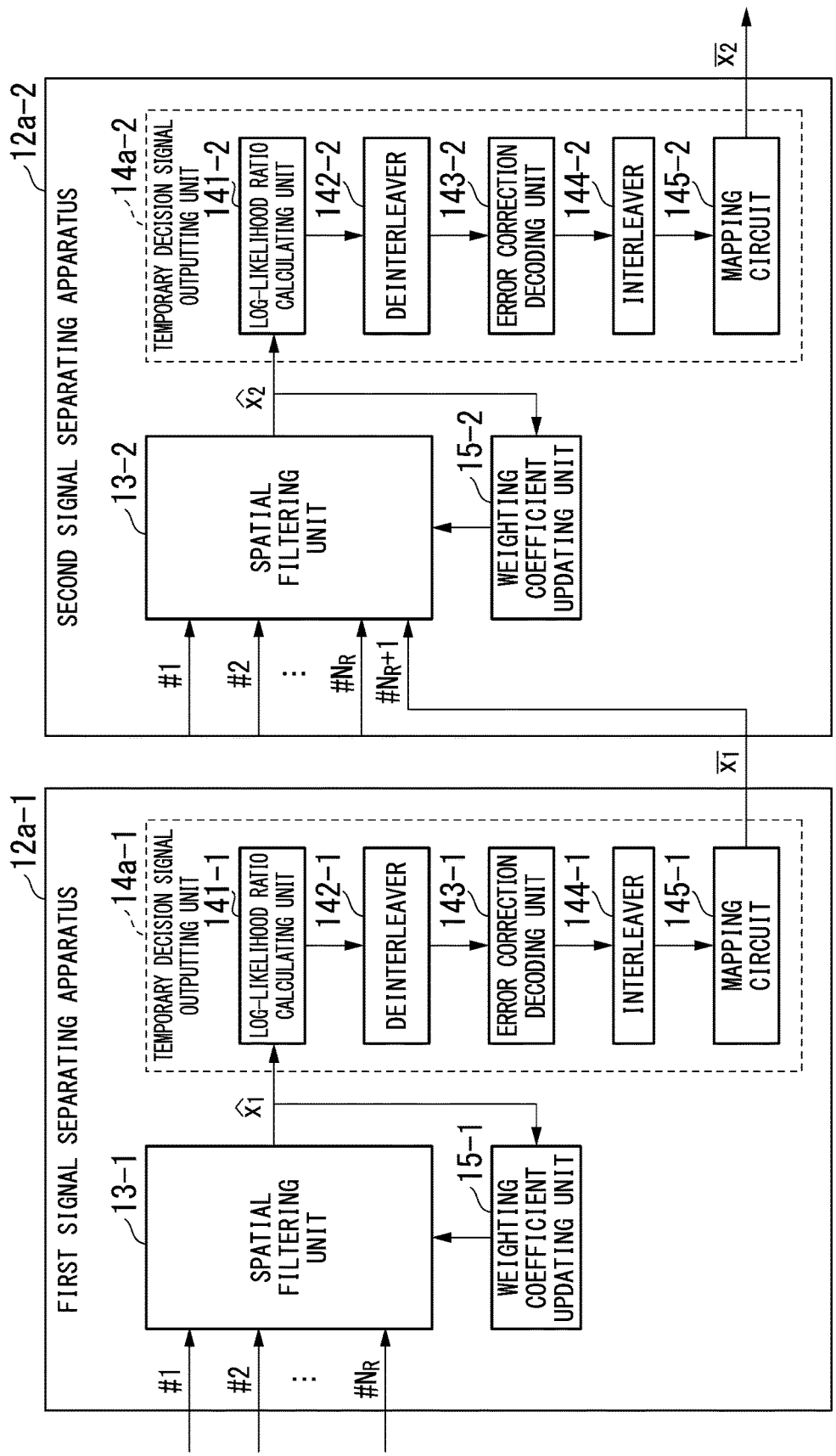
FIG. 4 is a schematic block diagram showing a functional configuration of an optical signal receiving apparatus 10a in the second embodiment.

FIG. 4 is a schematic block diagram showing a functional configuration of an optical signal receiving apparatus 10$a$ in the second embodiment. FIG. 4 describes a process of a signal separating apparatus 12$a$ using a first signal separating apparatus 12$a$-1 and a second signal separating apparatus 12$a$-2 among signal separating apparatuses 12$a$ provided in the optical signal receiving apparatus 10$a$. It is to be noted that the present embodiment will also be described on the assumption that components of a received signal y are sorted in descending order of SINR for simplification of the description.

First, a configuration of the first signal separating apparatus 12$a$-1 will be described. The first signal separating apparatus 12$a$-1 includes a spatial filtering unit 13-1, a temporary decision signal outputting unit 14$a$-1, and a weighting coefficient updating unit 15-1.

The configuration of the first signal separating apparatus 12$a$-1 is different from that of the first signal separating apparatus 12-1 in that the temporary decision signal outputting unit 14$a$-1 is provided in place of the temporary decision signal outputting unit 14-1. The other components of the first signal separating apparatus 12$a$-1 are similar to those of the first signal separating apparatus 12-1. Thus, the entire description of the first signal separating apparatus 12$a$-1 will be omitted and the temporary decision signal outputting unit 14$a$-1 will be described.

The temporary decision signal outputting unit 14$a$-1 inputs an equalized signal $x_1^{\wedge}$ obtained by the process of the spatial filtering unit 13-1 and outputs a first temporary decision signal $x_1^-$ obtained from the input equalized signal $x_1^{\wedge}$ to a second signal separating apparatus 12-2. The temporary decision signal outputting unit 14$a$-1 includes a log-likelihood ratio calculating unit 141-1, a deinterleaver 142-1, an error correction decoding unit 143-1, an interleaver 144-1, and a mapping circuit 145-1.

The log-likelihood ratio calculating unit 141-1 inputs the equalized signal $x_1^{\wedge}$ obtained by the process of the spatial filtering unit 13-1 and calculates a log-likelihood ratio between a probability at which 0 has been transmitted and a probability at which 1 has been transmitted in a state in which a received signal y has been received for each of the bits constituting the input equalized signal $x_1^{\wedge}$. The log-likelihood ratio calculating unit 141-1 outputs the calculated log-likelihood ratio to the deinterleaver 142-1. The deinterleaver 142-1 rearranges the log-likelihood ratio output from the log-likelihood ratio calculating unit 141-1 for each bit. The deinterleaver 142-1 outputs the rearranged log-likelihood ratio to the error correction decoding unit 143-1.

The error correction decoding unit 143-1 performs decoding using an error correction code similar to an error correction code used at an optical signal transmission apparatus side. The error correction code in the present embodiment is not limited to specific error correction codes such as, for example, a Hamming code, a BCH code, a low density parity check (LDPC) code, and a convolutional code and any error correction code may be used. The interleaver 144-1 rearranges each of the bits of the signal output from the error correction decoding unit 143-1 in a manner similar to that of the optical signal transmission apparatus side. The mapping circuit 145-1 generates the first temporary decision signal $x_1^-$ by mapping the rearranged bits to symbols. The mapping circuit 145-1 outputs the generated first temporary decision signal $x_1^-$ to the second signal separating apparatus 12-2.

Next, a configuration of the second signal separating apparatus 12$a$-2 will be described. The second signal separating apparatus 12$a$-2 includes a spatial filtering unit 13-2, a temporary decision signal outputting unit 14$a$-2, and a weighting coefficient updating unit 15-2.

The configuration of the second signal separating apparatus 12$a$-2 is different from that of the second signal separating apparatus 12-2 in that the temporary decision signal outputting unit 14$a$-2 is provided in place of the temporary decision signal outputting unit 14-2. The other components of the second signal separating apparatus 12$a$-2 are similar to those of the second signal separating apparatus 12-2. Thus, the entire description of the second signal separating apparatus 12a-2 will be omitted and the temporary decision signal outputting unit 14a-2 will be described.

The temporary decision signal outputting unit 14a-2 inputs an equalized signal $x_2\hat{}$ obtained by the process of the spatial filtering unit 13-2 and outputs a second temporary decision signal $x_2^-$ obtained from the input equalized signal $x_2\hat{}$ to the signal separating apparatus 12 at the subsequent stage. The temporary decision signal outputting unit 14a-2 includes a log-likelihood ratio calculating unit 141-2, a deinterleaver 142-2, an error correction decoding unit 143-2, an interleaver 144-2, and a mapping circuit 145-2. It is to be noted that a description of processes of the log-likelihood ratio calculating unit 141-2, the deinterleaver 142-2, the error correction decoding unit 143-2, the interleaver 144-2, and the mapping circuit 145-2 will be omitted because they perform processes similar to those of the same functional units provided in the temporary decision signal outputting unit 14a-1.

It is to be noted that although a description has been given using two signal separating apparatuses 12a with reference to FIG. 4, a total of $(N_R+2)$ signals including the $N_R$ signals output from a receiving unit 11, the first temporary decision signal $x_1^-$ output from the first signal separating apparatus 12a-1, and the second temporary decision signal $x_2^-$ output from the second signal separating apparatus 12a-2 are input to a third signal separating apparatus 12a-3. In this way, in the signal separating apparatus 12a-k in the present embodiment, the spatial filtering unit 13 inputs a signal having a total of $(N_R+k-1)$ components including (k-1) signal components separated and decided by first to $(k-1)^{th}$ signal separating apparatuses 12a-1 to 12a-(k-1) and $N_R$ signals output from the receiving unit 11, and a signal k is separated.

Figure 5:
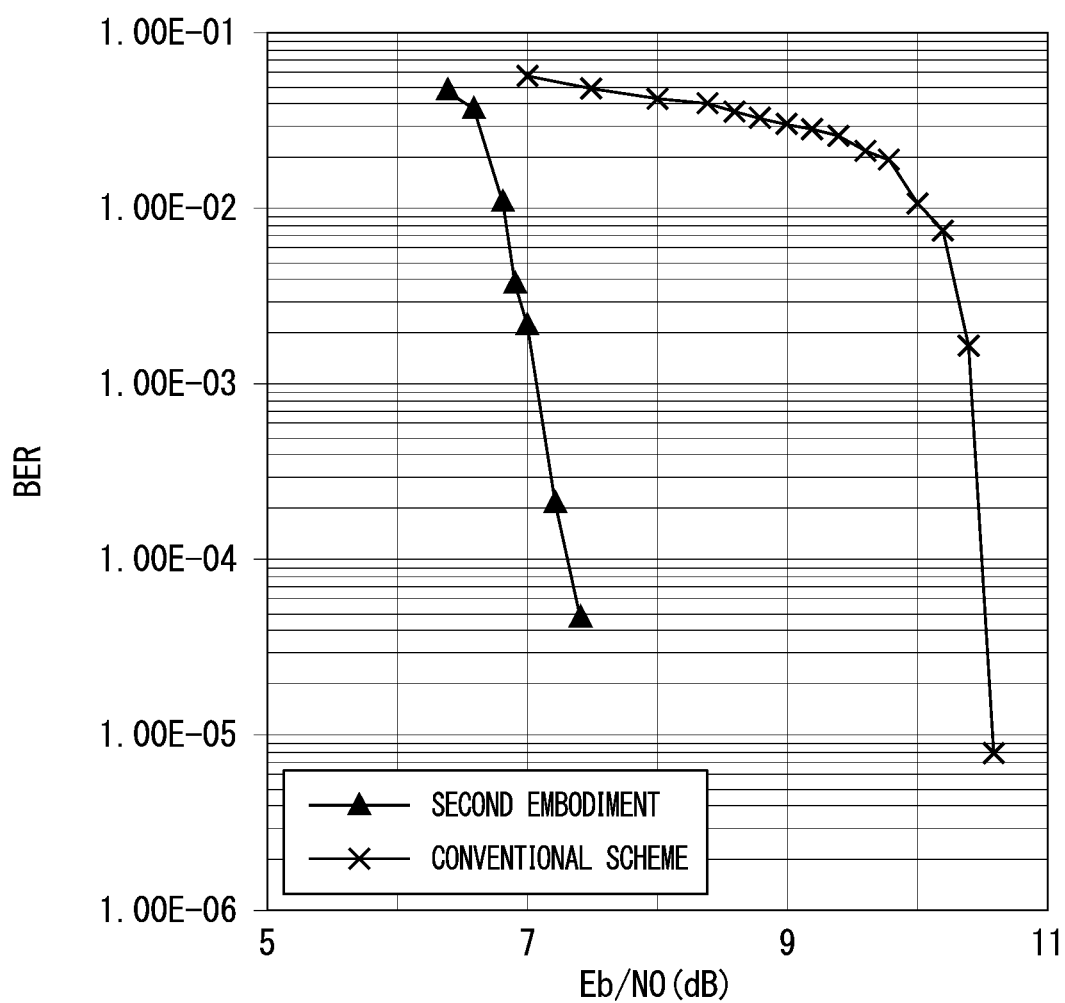
FIG. 5 is a diagram describing the advantageous effect of the second embodiment.

FIG. 5 shows the result obtained by simulating the transmission for checking the advantageous effect of the second embodiment. In FIG. 5, a 2×2 MIMO system was assumed as a transmission path model and a correlation coefficient between $h_1$ of a first row and $h_2$ of a second row in a transmission path matrix H was set to 0.8. Also, independent QPSK signals were transmitted from two optical signal transmitting apparatuses and average bit error rates of both signals when the energy per bit to noise power spectral density ratio (Eb/N0) was varied were recorded. FIG. 5 shows a result of comparing bit error rates of a conventional scheme and the second embodiment. It can be seen from FIG. 5 that as a gain of Eb/N0, i.e., as an SNR gain, about 3.5 dB is obtained at a bit error rate of $10^{-3}$ by applying the second embodiment.

With the optical signal receiving apparatus 10a configured as described above, it is possible to obtain an advantageous effect similar to that of the first embodiment.

Also, the optical signal receiving apparatus 10a performs error correction when the temporary decision signals are generated. Thereby, it is possible to separate multiplexed signals with higher accuracy than in the first embodiment.

Also, the signal detection performance of the successive interference cancelers generally depends on the accuracy in generation of a replica signal. The signal detection performance of the sequential interference cancelers is easily deteriorated because an error is easily included when the equalization signal $x_1\hat{}$ output from the space filtering unit 13-1 is temporarily decided without involving the error correction decoding unit 143-1. In contrast, by temporarily deciding the equalized signal $x_1\hat{}$ output from the spatial filtering unit 13-1 through the error correction decoding unit 143-1, an advantageous effect of the error correction decoding is combined with an advantageous effect of the interleaver; thus, if a bit error rate is less than or equal to an error threshold value or near the error threshold value, the accuracy in generation of a replica signal can be improved and consequently the signal detection performance of the successive interference cancelers can be improved.

Third Embodiment

Figure 6:
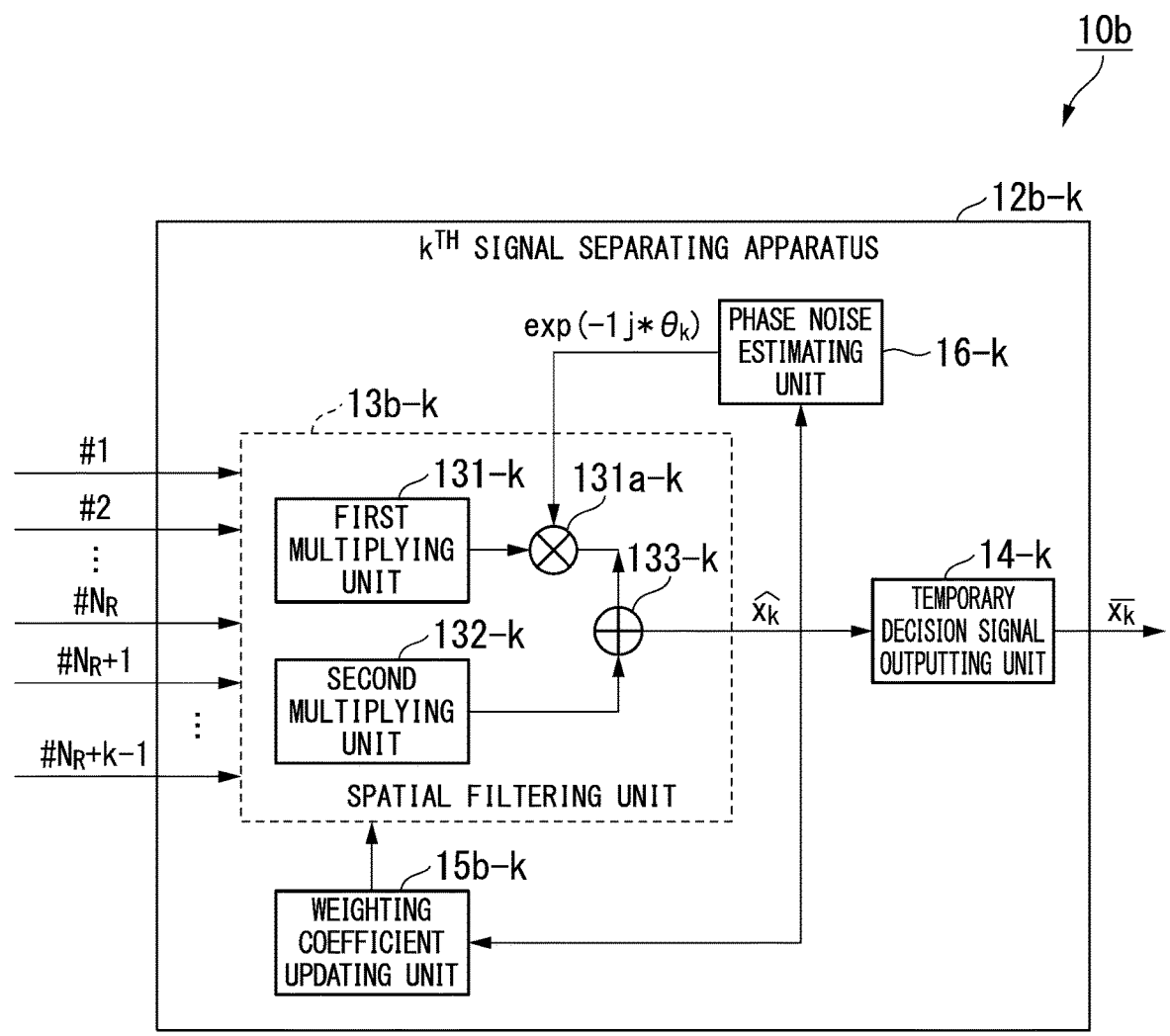
FIG. 6 is a schematic block diagram showing a functional configuration of a $k^{th}$ signal separating apparatus 12b-k in an optical signal receiving apparatus 10b of the third embodiment.

FIG. 6 is a schematic block diagram showing a functional configuration of a $k^{th}$ signal separating apparatus 12b-k in an optical signal receiving apparatus 10b in accordance with the third embodiment. It is to be noted that the present embodiment will also be described on the assumption that components of a received signal y are sorted in descending order of SINR for simplification of the description.

The $k^{th}$ signal separating apparatus 12b-k includes a spatial filtering unit 13b-k, a temporary decision signal outputting unit 14-k, a weighting coefficient updating unit 15b-k, and a phase noise estimating unit 16-k.

The configuration of the $k^{th}$ signal separating apparatus 12b-k is different from that of the $k^{th}$ signal separating apparatus 12-k (e.g., the second signal separating apparatus 12-2 in the case of k=2) in that the spatial filtering unit 13b-k and the weighting coefficient updating unit 15b-k are provided in place of the spatial filtering unit 13-k and the weighting coefficient updating unit 15-k and the phase noise estimating unit 16-k is newly provided. The other components of the $k^{th}$ signal separating apparatus 12b-k is similar to those of the $k^{th}$ signal separating apparatus 12-k. Thus, the entire description of the $k^{th}$ signal separating apparatus 12b-k will be omitted and the spatial filtering unit 13b-k, the weighting coefficient updating unit 15b-k, and the phase noise estimating unit 16-k will be described.

The spatial filtering unit 13b-k inputs a total of $(N_R+k-1)$ signals including $N_R$ signals output from a receiving unit 11 and first to $(k-1)^{th}$ temporary decision signals $x_1^-$ to $x_{(k-1)}^-$ output by first to $(k-1)^{th}$ signal separating apparatuses 12-1 to 12b-(k-1). The spatial filtering unit 13b-k separates an equalized signal by multiplying the $(N_R+k-1)$ input signals by $k^{th}$ weighting coefficients $w^T_k$ output from the weighting coefficient updating unit 15b-k. For example, the spatial filtering unit 13b-k separates an equalized signal $x_k\hat{}$ on the basis of the following Formula (12).

[Formula 12]

$$\widehat{x_k} = (w_{k1}^T y)\exp(-1j*\theta_k) + w_{k2}^T[\overline{x_1}; \overline{x_2}; \ldots \overline{x_{k-1}}] \quad (12)$$

In Formula (12), the multiplication of the first term is performed by a first multiplying unit 131-k and a multiplier 131a-k and the multiplication of the second term is performed by a second multiplying unit 132-k. Here, $w^T_{k1}$ denotes an $N_R \times 1$ column vector and $w^1_{k2}$ denotes a (k-1)×1 column vector. Also, $\theta_k$ denotes phase noise estimated for the signal k by the phase noise estimating unit 16-k.

The spatial filtering unit 13b-k includes the first multiplying unit 131-k, the multiplier 131a-k (a third multiplying unit), the second multiplying unit 132-k, and an adder 133-k (an addition unit).

The first multiplying unit 131-k multiplies the $N_R$ signals that are received signals among the $(N_R+k-1)$ input signals by $k^{th}$ weighting coefficients $w^T_{k1}$ output from the weighting coefficient updating unit 15b-k. In this way, the first multiplying unit 131-k multiplies the $N_R$ received signals by the coefficients.

The multiplier 131a-k multiplies an output signal output from the first multiplying unit 131-k by the phase noise estimated by the phase noise estimating unit 16-k.

The second multiplying unit 132-$k$ multiplies the (k−1) signals of the ($N_R$+k−1) input signals by $k^{th}$ weighting coefficients $w^T_{k2}$ output from the weighting coefficient updating unit 15$b$-$k$. The (k−1) signals input to the second multiplying unit 132-$k$ are the first to (k−1)$^{th}$ temporary decision signals $x_1^-$ to $x_{(k-1)}^-$ output by the first to (k−1)$^{th}$ signal separating apparatuses 12-1 to 12$b$-(k−1). In this way, the second multiplying unit 132-$k$ multiplies the (k−1) signals by the coefficients.

The adder 133-$k$ sums a multiplication result obtained by the multiplier 131$a$-$k$ and a multiplication result obtained by the second multiplying unit 132-$k$ to generate an equalized signal $\hat{x_k}$. The adder 133-$k$ outputs the generated equalized signal $\hat{x_k}$ to the temporary decision signal outputting unit 14-$k$, the weighting coefficient updating unit 15$b$-$k$, and the phase noise estimating unit 16-$k$.

The phase noise estimating unit 16-$k$ inputs the equalized signal $\hat{x_k}$ obtained by the process of the spatial filtering unit 13$b$-$k$, and estimates the phase noise from the input equalized signal $\hat{x_k}$. An algorithm to be used by the phase noise estimating unit 16-$k$ is not particularly limited and a digital phase-locked loop method, a Viterbi-Viterbi algorithm, or the like can be used. Also, the phase noise estimating unit 16-$k$ may use an output from an optical phase-locked loop.

The weighting coefficient updating unit 15$b$-$k$ inputs the equalized signal $\hat{x_k}$ output from the spatial filtering unit 13$b$-$k$. The weighting coefficient updating unit 15$b$-$k$ uses an adaptive algorithm such as an LMS method, an RLS method, or a CMA method and the input equalized signal $\hat{x_k}$, and updates the $k^{th}$ weighting coefficient $w^T_k$ using the input equalized signal $\hat{x_k}$ with an error $e_k$ as shown in the following Formula (13).

[Formula 13]

$$w_k^T \leftarrow w_k^T + \mu e_k [y^* \exp(1j^*\theta_k); \overline{x_1}^*; \overline{x_2}^*; \ldots ; \overline{x_{k-1}}^*] \quad (13)$$

With the optical signal receiving apparatus 10$b$ configured as described above, advantageous effects similar to those of the first embodiment and the second embodiment can be obtained.

Also, as described above, the signal detection performance of the successive interference cancelers significantly depends on the accuracy in generation of the replica signal. In the case of optical coherent detection, phase noise due to a phase shift and/or a frequency shift of a light source at the transmission side and local oscillation light at the reception side is superimposed on the received signal. When the conventional successive interference canceler is applied to optical communication, in order to improve the accuracy in generation of the replica signal, it is not only necessary to obtain changes in a phase and amplitude in a propagation path, i.e., channel information, with high accuracy but also necessary to calculate phase noise with high accuracy before an input of the spatial filtering unit 13$b$-$k$. In contrast, it is not necessary to estimate channel information and estimate phase noise in advance by combining and using the phase noise estimating unit 16-$k$ and the spatial filtering unit 13$b$-$k$ in the present embodiment.

MODIFIED EXAMPLES

The temporary decision signal outputting unit 14-$k$ provided in the $k^{th}$ signal separating apparatus 12$b$-$k$ may be replaced with one having an error correction function. That is, as in the second embodiment, the temporary decision signal outputting unit 14-$k$ may include a log-likelihood ratio calculating unit, a deinterleaver, an error correction decoding unit, an interleaver, and a mapping circuit.

Fourth Embodiment

Figure 7:
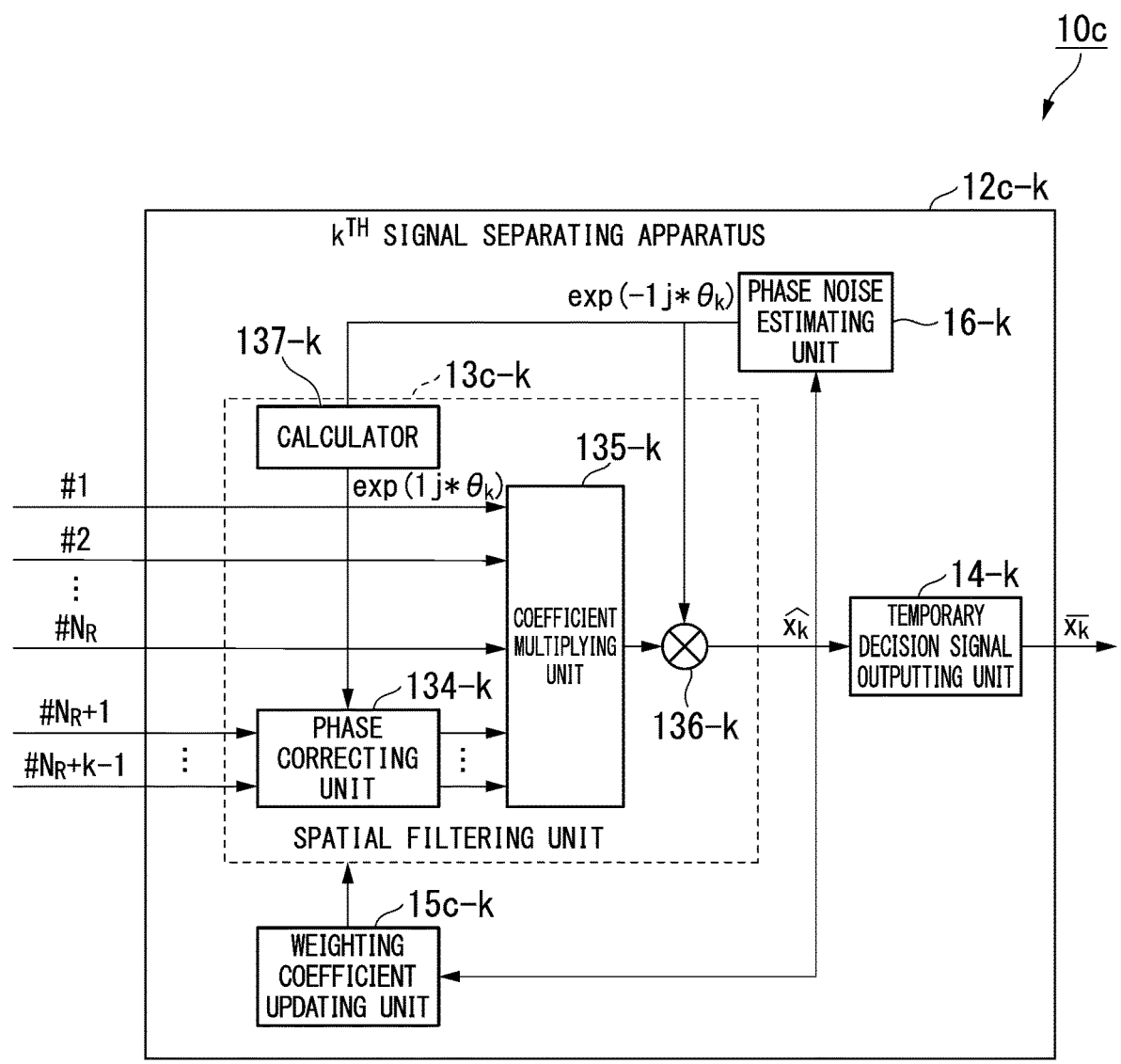
FIG. 7 is a schematic block diagram showing a functional configuration of a $k^{th}$ signal separating apparatus 12c-k in an optical signal receiving apparatus 10c of the fourth embodiment.

FIG. 7 is a schematic block diagram showing a functional configuration of a $k^{th}$ signal separating apparatus 12$c$-$k$ in an optical signal receiving apparatus 10$c$ in the fourth embodiment. It is to be noted that the present embodiment will also be described on the assumption that components of a received signal y are sorted in descending order of SINR for simplification of the description.

The $k^{th}$ signal separating apparatus 12$c$-$k$ includes a spatial filtering unit 13$c$-$k$, a temporary decision signal outputting unit 14-$k$, a weighting coefficient updating unit 15$c$-$k$, and a phase noise estimating unit 16-$k$.

The configuration of the $k^{th}$ signal separating apparatus 12$c$-$k$ is different from that of the $k^{th}$ signal separating apparatus 12$b$-$k$ (e.g., the second signal separating apparatus 12$b$-2 in the case of k=2) in that the spatial filtering unit 13$c$-$k$ and the weighting coefficient updating unit 15$c$-$k$ are provided in place of the spatial filtering unit 13$b$-$k$ and the weighting coefficient updating unit 15$b$-$k$. The other components of the $k^{th}$ signal separating apparatus 12$c$-$k$ are similar to those of the $k^{th}$ signal separating apparatus 12$b$-$k$. Thus, the entire description of the $k^{th}$ signal separating apparatus 12$c$-$k$ will be omitted and the spatial filtering unit 13$c$-$k$ and the weighting coefficient updating unit 15$c$-$k$ will be described.

The spatial filtering unit 13$c$-$k$ inputs a total of ($N_R$+k−1) signals including $N_R$ signals output from a receiving unit 11 and first to (k−1)$^{th}$ temporary decision signals $x_1^-$ to $x_{(k-1)}^-$ output by first to (k−1)$^{th}$ signal separating apparatuses 12-1 to 12-$c$-(k−1). The spatial filtering unit 13$c$-$k$ separates an equalized signal by multiplying the ($N_R$+k−1) input signals by $k^{th}$ weighting coefficients $w^T_k$ output from the weighting coefficient updating unit 15$c$-$k$ and phase noise estimated by the phase noise estimating unit 16-$k$. For example, the spatial filtering unit 13$c$-$k$ separates an equalized signal $\hat{x_k}$ on the basis of the following Formula (14).

[Formula 14]

$$\widehat{x_k} = (w_k^T y)\exp(-1j^*\theta_k) \quad (14)$$

The weighting coefficient updating unit 15$c$-$k$ inputs the equalized signal $\hat{x_k}$ output from the spatial filtering unit 13$c$-$k$. The weighting coefficient updating unit 15$c$-$k$ updates the $k^{th}$ weighting coefficients $w^T_k$ using an adaptive algorithm such as an LMS method, an RLS method, or a CMA method and the input equalized signal $\hat{x_k}$. For example, when the LMS method is used, the weighting coefficient updating unit 15$c$-$k$ updates the $k^{th}$ weighting coefficients $w^T_k$ as shown in the following Formula (15).

[Formula 15]

$$w_k^T \leftarrow w_K^T + \mu e_k y^* \exp(1j^*\theta_k) \quad (15)$$

Next, details of the spatial filtering unit 13$c$-$k$ will be described. The spatial filtering unit 13$c$-$k$ includes a phase correcting unit 134-$k$, a coefficient multiplying unit 135-$k$, a multiplier 136-$k$, and a calculator 137-$k$.

The calculator 137-$k$ calculates phase noise correction (corresponding to $\exp(1j^*\theta_k)$ in FIG. 7) from the phase noise (corresponding to $\exp(-1j^*\theta_k)$ in FIG. 7) estimated by the phase noise estimating unit 16-$k$. The phase correcting unit 134-$k$ performs phase correction using (k−1) signals among the ($N_R$+k−1) input signals and the phase noise correction calculated by the calculator 137-$k$. For example, the phase correcting unit 134-$k$ performs phase correction on the basis of the following Formula (16).

[Formula 16]

$$\overline{x}_p \leftarrow \overline{x}_p \exp(1j^*\theta_k) \quad (16)$$

In Formula (16), p is an integer and 1≤p≤(k−1). For example, in the case of FIG. 7, the phase correcting unit 134-$k$ corrects the phase of a signal #$N_R$+1 output from the first signal separating apparatus 12-1 by the phase noise correction by multiplying the signal #$N_R$+1. Also, the phase correcting unit 134-$k$ corrects the phase of a signal #$N_R$+(k−1) output from the (k−1)$^{th}$ signal separating apparatus 12-$c$-(k−1) by multiplying the signal #$N_R$+(k−1) by the phase noise correction. The phase correcting unit 134-$k$ outputs (k−1) signals after phase correction to the coefficient multiplying unit 135-$k$. It is to be noted that the (k−1) signals input to the phase correcting unit 134-$k$ are first to (k−1)$^{th}$ temporary decision signals $x_1^\sim$ to $x_{(k-1)}^\sim$ output by first to (k−1)$^{th}$ signal separating apparatuses 12$c$-1 to 12-$c$-(k−1).

The coefficient multiplying unit 135-$k$ multiplies $N_R$ signals among the ($N_R$+k−1) input signals and the (k−1) signals after phase correction by $k^{th}$ weighting coefficients $w^T_k$ output from the weighting coefficient updating unit 15$c$-$k$.

The multiplier 136-$k$ generates an equalized signal $x_k^\wedge$ by multiplying an output signal output from the coefficient multiplying unit 135-$k$ and the phase noise estimated by the phase noise estimating unit 16-$k$. The multiplier 136-$k$ outputs the generated equalized signal $x_k^\wedge$ to the temporary decision signal outputting unit 14-$k$, the weighting coefficient updating unit 15$c$-$k$, and the phase noise estimating unit 16-$k$.

With the optical signal receiving apparatus 10$c$ configured as described above, advantageous effects similar to those of the first embodiment and the second embodiment can be obtained.

MODIFIED EXAMPLES

The temporary decision signal outputting unit 14-$k$ provided in the $k^{th}$ signal separating apparatus 12$c$-$k$ may be replaced with one having an error correction function. That is, as in the second embodiment, the temporary decision signal outputting unit 14-$k$ may include a log-likelihood ratio calculating unit, a deinterleaver, an error correction decoding unit, an interleaver, and a mapping circuit.

Fifth Embodiment

Figure 8:
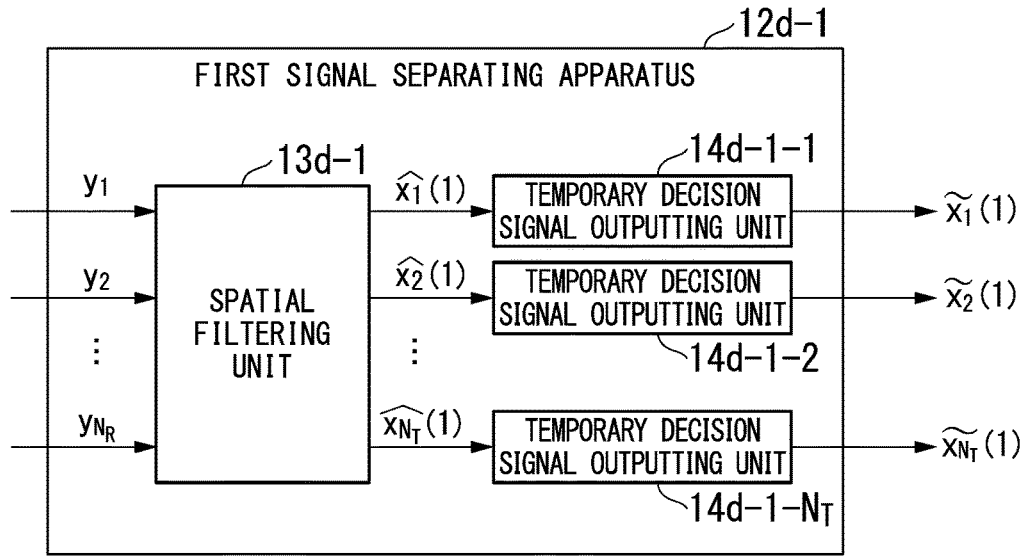
FIG. 8 is a schematic block diagram showing a functional configuration of a first signal separating apparatus in an optical signal receiving apparatus of a fifth embodiment.
Figure 9:
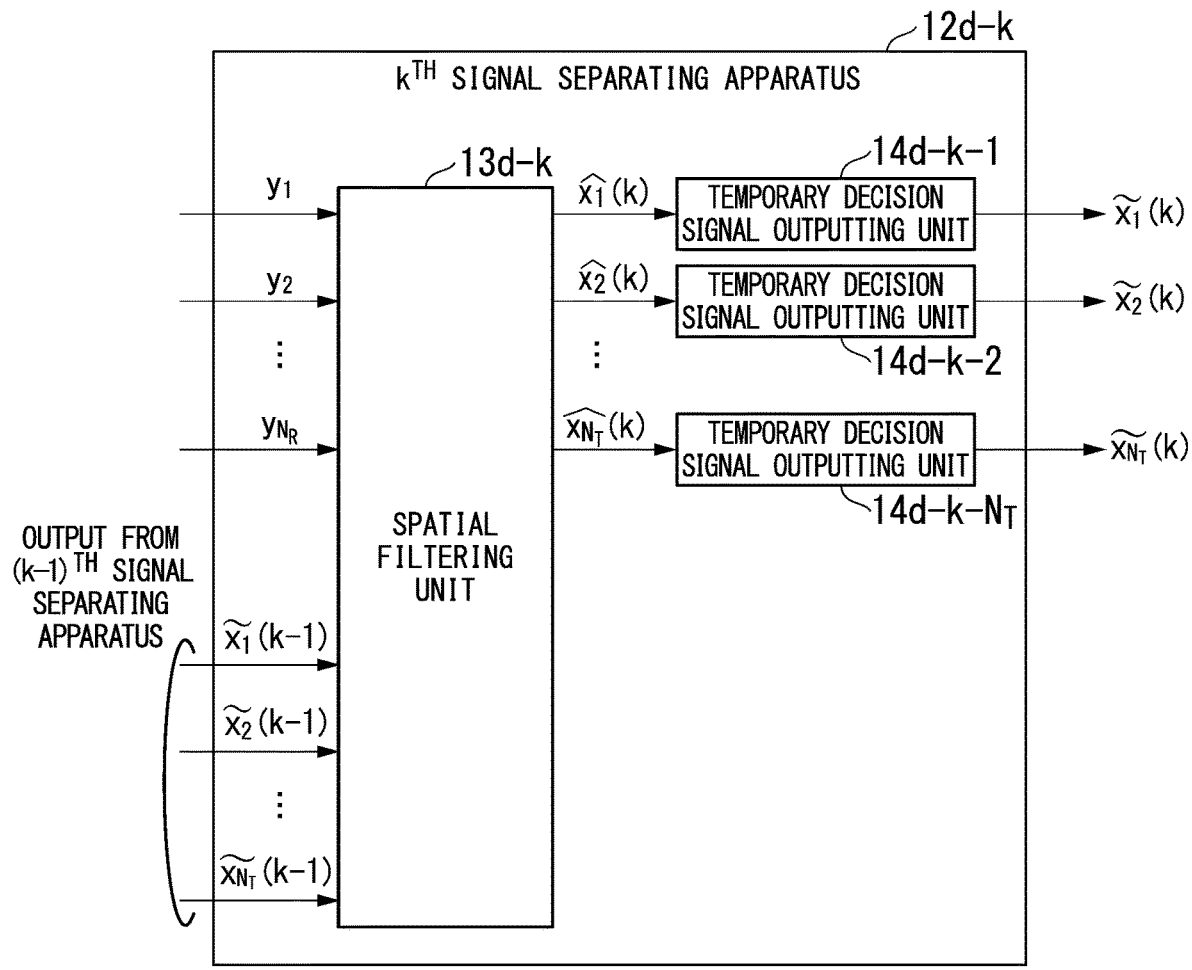
FIG. 9 is a schematic block diagram showing a functional configuration of a $k^{th}$ signal separating apparatus in the optical signal receiving apparatus of the fifth embodiment.

FIGS. 8 and 9 are schematic block diagrams showing functional configurations of signal separating apparatuses provided in an optical signal receiving apparatus in a fifth embodiment. The configuration of the optical signal receiving apparatus of the present embodiment is different from that of the optical signal receiving apparatus in the first embodiment in that a first signal separating apparatus 12$d$-1 and a $k^{th}$ signal separating apparatus 12$d$-$k$ are provided in place of the first signal separating apparatus 12-1 and the $k^{th}$ signal separating apparatus 12-$k$ shown in FIG. 1.

FIG. 8 is a schematic block diagram showing the functional configuration of the first signal separating apparatus 12$d$-1, and FIG. 9 is a schematic block diagram showing the functional configuration of the $k^{th}$ signal separating apparatus 12$d$-$k$. The first signal separating apparatus 12$d$-1 includes a spatial filtering unit 13$d$-1 and temporary decision signal outputting units 14$d$-1-1 to 14$d$-1-$N_T$. The $k^{th}$ signal separating apparatus 12$d$-$k$ includes a spatial filtering unit 13$d$-$k$ and temporary decision signal outputting units 14$d$-$k$-1 to 14$d$-$k$-$N_T$. Each of the spatial filtering units 13$d$-1 and 13$d$-$k$ includes $N_T$ spatial filtering units.

Next, processes of the first signal separating apparatus 12$d$-1 and the $k^{th}$ signal separating apparatus 12$d$-$k$ will be described. Received signal sequences y1 to y$N_R$ ("1" and "$N_R$" indicate subscripts) are input to the spatial filtering unit 13$d$-1 of the first signal separating apparatus 12$d$-1. The spatial filtering unit 13$d$-1 multiplies the received signal sequences y1 to y$N_R$ by weighting coefficients and outputs equalized output sequences x1^(1) to x$N_T$^(1) (equalized signals) ("1" and "$N_T$" are subscripts). Here, the number in parentheses ("1" in this case) represents the number of a signal separating apparatus. The temporary decision signal outputting units 14$d$-1-1 to 14$d$-1-$N_T$ input the equalized output sequences x1^(1) to x$N_T$^(1), respectively, temporarily decide the input signals, and output decision results as temporary decision signal sequences x1$^\sim$(1) to x$N_T^\sim$(1) (~ is added above "x1" and "x$N_T$"). Here, temporary decision means deciding a signal likely as an equalized signal. It is to be noted that an example of the decision process is as described in the first embodiment.

Next, the received signal sequences y1 to y$N_R$ and the temporary decision signal sequences x1$^\sim$(1) to x$N_T^\sim$(1) are input to the spatial filtering unit 13$d$-2 of the second signal separating apparatus 12$d$-2 shown in FIG. 9 (k=2 in FIG. 9 in this case). The spatial filtering unit 13$d$-2 multiplies the received signal sequences y1 to y$N_R$ and the temporary decision signal sequence x1$^\sim$(1) to x$N_T^\sim$(1) by weighting coefficients and outputs equalized output sequences x1^(2) to x$N_T$^(2). The temporary decision signal outputting units 14$d$-2-1 to 14$d$-2-$N_T$ input the equalized output sequences x1^(2) to x$N_T$^(2), temporarily decide the input signals, and output decision results as temporary decision signal sequences x1$^\sim$(2) to x$N_T^\sim$(2). The signal detection processes after the third signal separating apparatus 12$d$-3 (k=3 in FIG. 9) are performed as in the second signal separating apparatus 12$d$-2.

As described above, it is possible to effectively remove interference components superimposed on a received signal while improving the accuracy in detection of signals by performing signal detection processes in a plurality of stages using the first signal separating apparatus 12$d$-1 and the $k^{th}$ signal separating apparatus 12$d$-$k$. At this time, k corresponds to the number of iterations of the signal detection process and is a number capable of being set by a business entity. In the present embodiment, an upper limit value of k is set to P ("a predetermined number of times"). Although many apparatuses that perform an iterative process have a feedback structure, it is possible for the present embodiment to equivalently perform an iterative process by connecting a plurality of signal separating apparatuses (in cascade).

The above-described process is performed until a P stage (i.e., a P$^{th}$ signal separating apparatus 12$d$-P), and signal sequences x1$^\sim$ to x$N_T^\sim$ are finally output.

Figure 10:
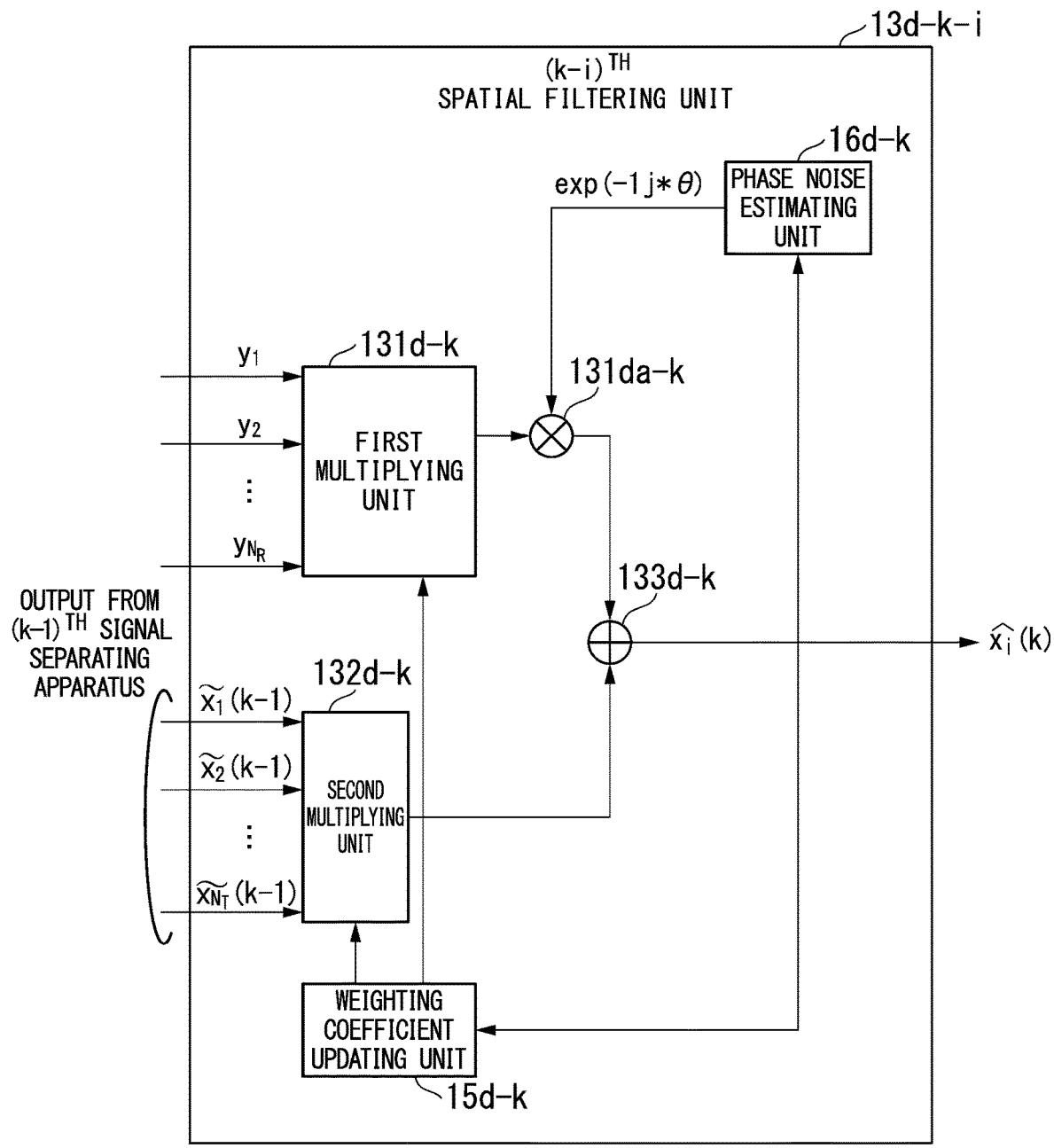
FIG. 10 is a schematic block diagram showing an example of a functional configuration of a spatial filtering unit in the fifth embodiment.

FIG. 10 is a schematic block diagram showing an example of a functional configuration of a (k-i)$^{th}$ spatial filtering unit 13$d$-$k$-$i$ constituting the spatial filtering unit 13$d$-$k$ (i is an integer greater than or equal to 1 and less than or equal to $N_T$). The (k-i)$^{th}$ spatial filtering unit 13$d$-$k$-$i$ performs an i$^{th}$ signal detection process. The (k-i)$^{th}$ spatial filtering unit 13$d$-$k$-$i$ includes a first multiplying unit 131$d$-$k$, a multiplier 131$da$-$k$ (a third multiplying unit), a second multiplying unit 132$d$-$k$, and an adder 133$d$-$k$ (an addition unit), a weighting coefficient updating unit 15$d$-$k$, and a phase noise estimating unit 16-$k$. The spatial filtering unit 13$d$-$k$ in the $k^{th}$ signal separating apparatus 12$d$-$k$ shown in FIG. 9 is configured by combining $N_T$ (k-i)$^{th}$ spatial filtering units.

Next, a signal detection process of the (k-1)$^{th}$ spatial filtering unit 13$d$-$k$-$i$ shown in FIG. 10 will be described. The first multiplying unit 131d-k multiplies the received signal sequences y1 to yN$_R$ by weighting coefficients output from the weighting coefficient updating unit 15d-k and outputs a multiplication result. The second multiplying unit 132d-k multiplies the temporary decision signal sequences x1~(k−1) to xN$_T$~(k−1) by weighting coefficients output from the weighting coefficient updating unit 15d-k, and outputs a multiplication result. The multiplier 131da-k multiplies the multiplication result output from the first multiplying unit 131d-k by a term exp(−1j*θ) corresponding to the phase noise output from the phase noise estimating unit 16d-k. The adder 133d-k sums a multiplication result output from the multiplier 131da-k and the multiplication result output from the second multiplying unit 132d-k, and outputs an equalized output sequence xi^(k).

The phase noise estimating unit 16d-k and the weighting coefficient updating unit 15d-k create teacher data on the basis of the equalized output sequence xi^(k), and respectively performs the estimation of the phase noise and the update of the weighting coefficients in accordance with predetermined algorithms. As the predetermined algorithms, for example, a Viterbi-Viterbi method is used in the phase noise estimating unit 16d-k and a stochastic gradient method is used in the weighting coefficient updating unit 15d-k.

Figure 11:
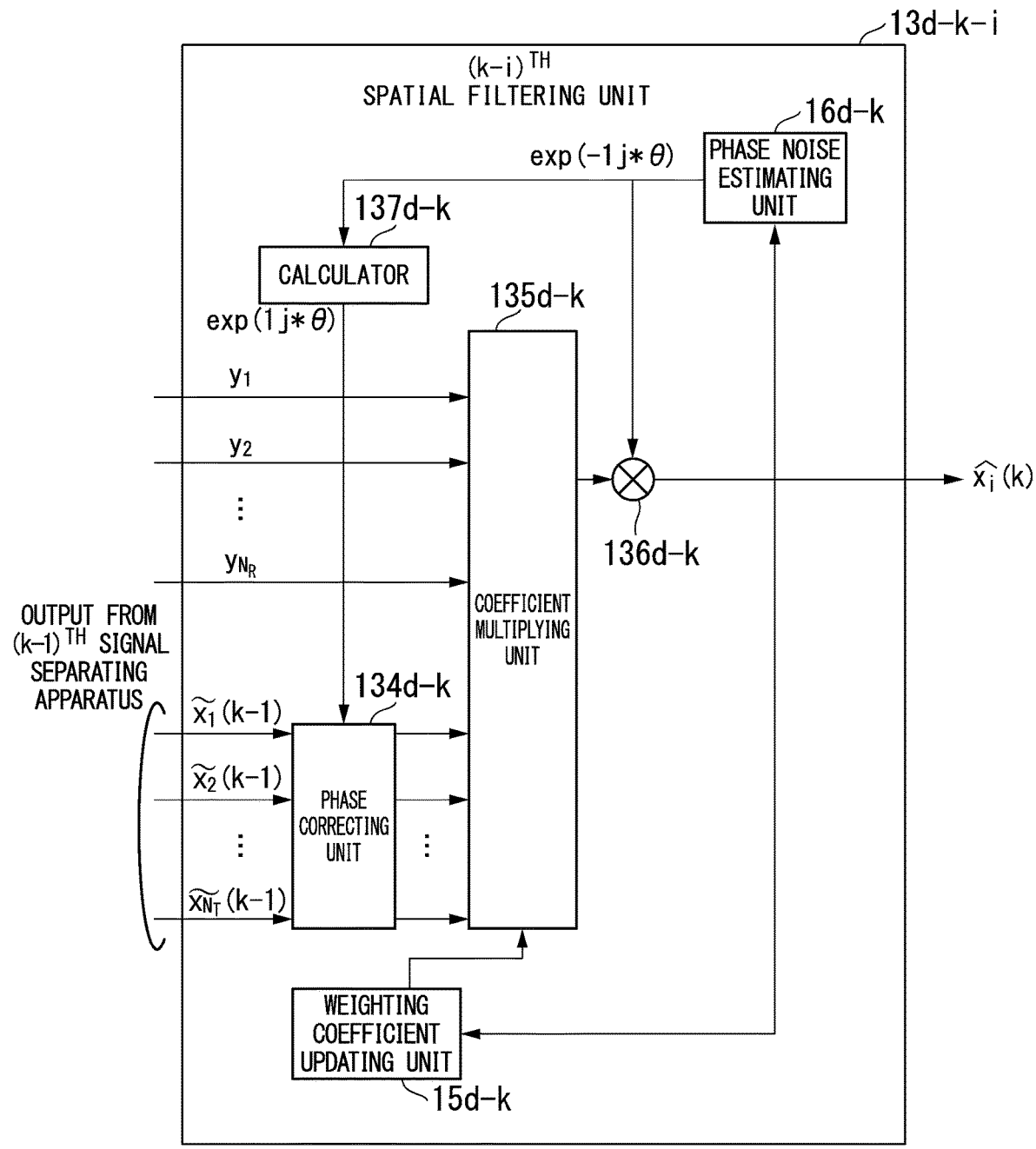
FIG. 11 is a schematic block diagram showing another example of the functional configuration of the spatial filtering unit in the fifth embodiment.

FIG. 11 is a schematic block diagram showing another example of the functional configuration of the (k-i)$^{th}$ spatial filtering unit 13d-k-i constituting the spatial filtering unit 13d-k. The configuration of the (k-i)$^{th}$ spatial filtering unit shown in FIG. 11 is different from that of the (k-i)$^{th}$ spatial filtering unit shown in FIG. 10 in that the first multiplying unit 131d-k, the multiplier 131da-k, the second multiplying unit 132d-k, and the adder 133d-k are not provided and a phase correcting unit 134d-k, a coefficient multiplying unit 135d-k, a multiplier 136d-k, and a calculator 137d-k are provided.

Next, a signal detection process of the (k-i)$^{th}$ spatial filtering unit 13d-k-i shown in FIG. 11 will be described. The calculator 137d-k calculates phase noise correction (exp (1j*θ) in FIG. 11) from phase noise (corresponding to exp(−1j*θ) in FIG. 11) estimated by the phase noise estimating unit 16d-k. The phase correcting unit 134d-k effectively adds phase noise to the temporary decision signal sequences x1~(k−1) to xN$_T$~(k−1) by multiplying the temporary decision signal sequences x1~(k−1) to xN$_T$~(k−1) by the term of exp(1j*θ) corresponding to the phase noise correction to thereby perform phase correction. The coefficient multiplying unit 135d-k multiplies temporary decision signal sequences after the phase noise correction and the received signal sequences y1 to yN$_R$ by weighting coefficients output from the weighting coefficient updating unit 15d-k and outputs a multiplication result. The multiplier 136d-k multiplies the multiplication result output from the coefficient multiplying unit 135d-k by the term exp(−1j*θ) corresponding to the phase noise estimated by the phase noise estimating unit 16d-k and outputs an equalized output sequence xi^(k).

Because the weighting coefficient updating unit 15d-k and the phase noise estimating unit 16d-k perform the same processes as the functional units of the same names illustrated in FIG. 10, a description thereof will be omitted here.

MODIFIED EXAMPLES

The temporary decision signal outputting units 14d-1-1 to 14d-1-N$_T$ and the temporary decision signal outputting units 14d-k-1 to 14d-k-N$_T$ may be replaced with those having an error correction function. That is, each of these temporary decision signal outputting units may include a log-likelihood ratio calculating unit, a deinterleaver, an error correction decoding unit, an interleaver, and a mapping circuit as in the second embodiment.

Sixth Embodiment

Figure 12:
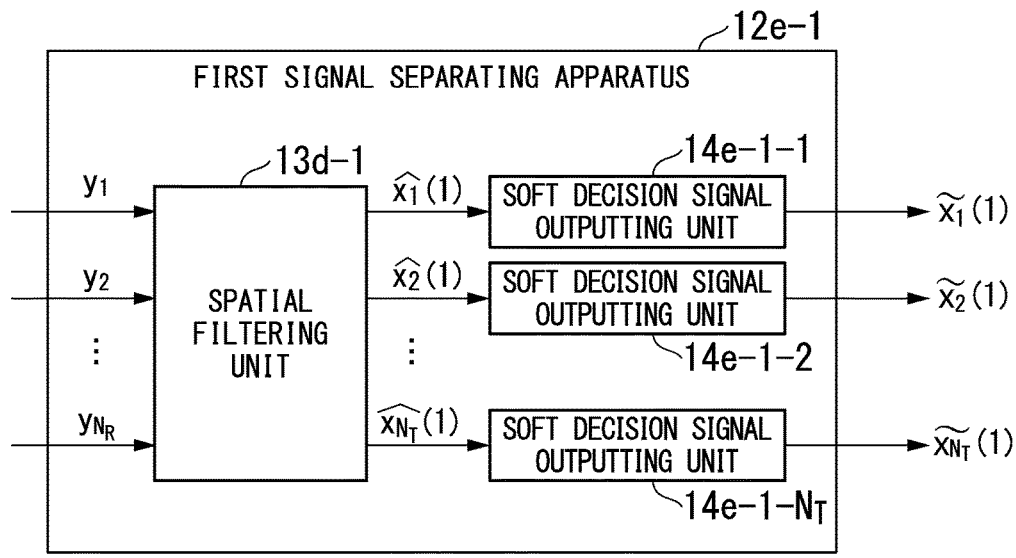
FIG. 12 is a schematic block diagram showing a functional configuration of a first signal separating apparatus in an optical signal receiving apparatus of a sixth embodiment.
Figure 13:
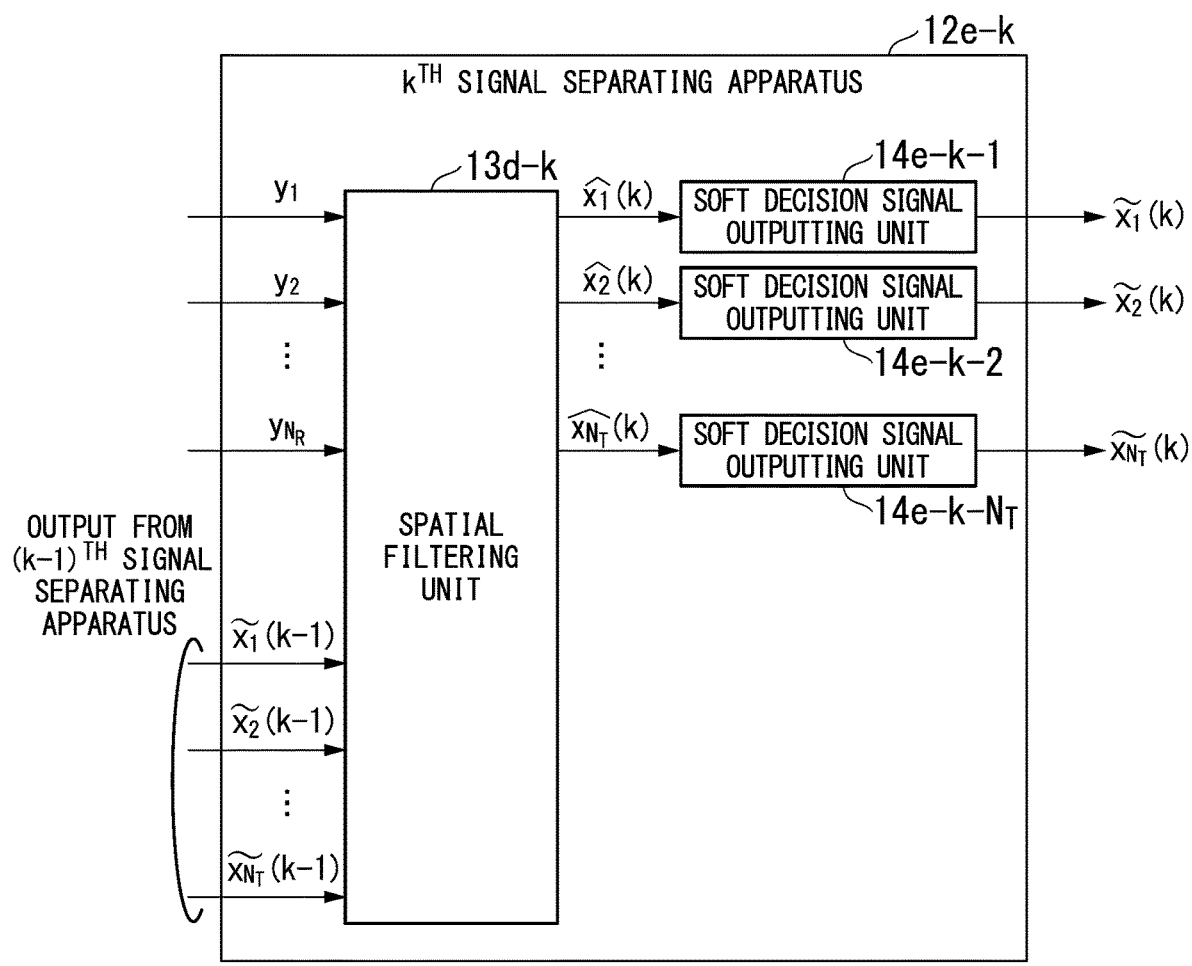
FIG. 13 is a schematic block diagram showing a functional configuration of a $k^{th}$ signal separating apparatus in the optical signal receiving apparatus of the sixth embodiment.

FIGS. 12 and 13 are schematic block diagrams showing functional configurations of signal separating apparatuses provided in an optical signal receiving apparatus in a sixth embodiment. FIG. 12 is a schematic block diagram showing a functional configuration of a first signal separating apparatus 12e-1, and FIG. 13 is a schematic block diagram showing a functional configuration of a k$^{th}$ signal separating apparatus 12e-k. The configurations of these signal separating apparatuses are different from those of the signal separating apparatuses in the fifth embodiment in that soft decision signal outputting units 14e-1-1 to 14e-1-N$_T$ and soft decision signal outputting units 14e-k-1 to 14e-k-N$_T$ are provided in place of the temporary decision signal outputting units 14d-1-1 to 14d-1-N$_T$ and the temporary decision signal outputting units 14d-k-1 to 14d-k-N$_T$ within the first signal separating apparatus 12d-1 and the k$^{th}$ signal separating apparatus 12d-k in the fifth embodiment.

The soft decision signal outputting units 14e-1-1 to 14e-1-N$_T$ and the soft decision signal outputting units 14e-k-1 to 14e-k-N$_T$ input equalized output sequences x1^(1) to xN$_T$^(1) and equalized output sequences x1^(k) to xN$_T$^(k) output from a spatial filtering unit 13d-1 and a spatial filtering unit 13d-k, respectively. The soft decision signal outputting units 14e-1-1 to 14e-1-N$_T$ and 14e-k-1 to 14e-k-N$_T$ then calculate likelihood information of transmitted signal information, such as transmitted bits and transmitted symbols, using a parity of an error correction code or the like previously added to the input equalized output sequences, generates soft decision symbols based on the likelihood information, and outputs the generated soft decision symbols as equalized output sequences x1^(1) to xN$_T$^(1) and equalized output sequences x1^(k) to xN$_T$^(k). The other signal input/output relationships and the process of each functional unit are similar to those of the fifth embodiment and thus a description thereof will be omitted here.

Figure 14:
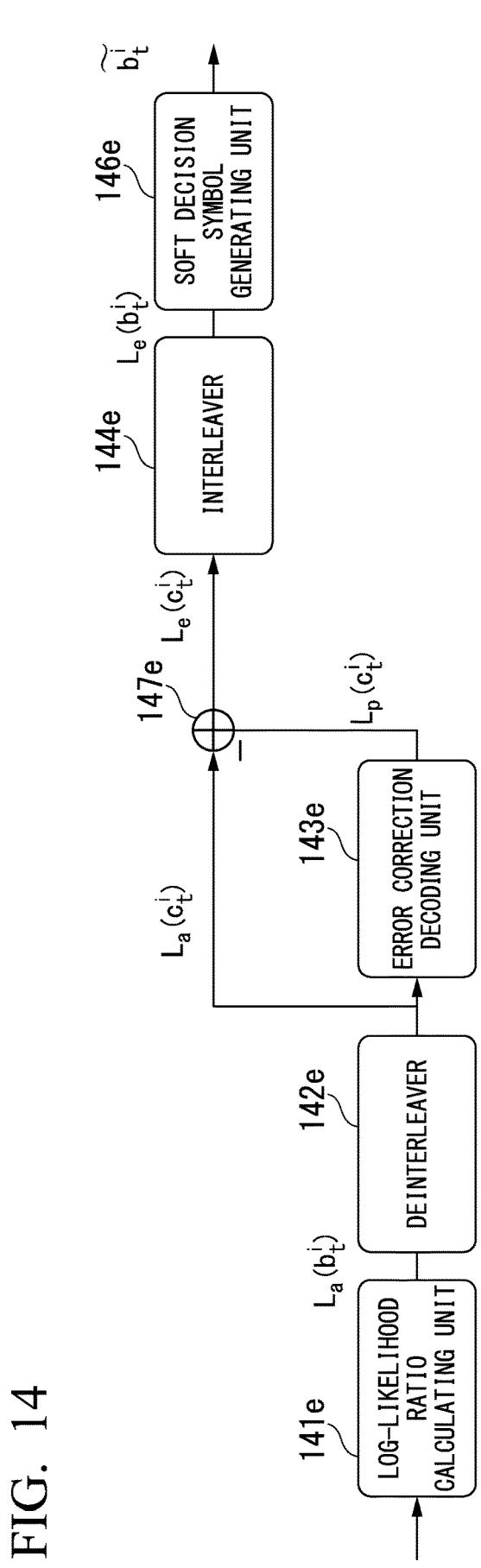
FIG. 14 is a schematic block diagram showing a functional configuration of a soft decision signal outputting unit in the optical signal receiving apparatus of the sixth embodiment.

FIG. 14 is a schematic block diagram showing a functional configuration of each soft decision signal outputting unit in the present embodiment. Each soft decision signal outputting unit includes a log-likelihood ratio calculating unit 141e, a deinterleaver 142e, an error correction decoding unit 143e, an interleaver 144e, a soft decision symbol generating unit 146e, and a subtractor 147e.

The log-likelihood ratio calculating unit 141e inputs an equalized output sequence xi^(k) output from the spatial filtering unit 13d-1 or the spatial filtering unit 13d-k and calculates a log-likelihood ratio L$_a$(b$^i_t$) between a probability at which 0 has been transmitted and a probability at which 1 has been transmitted with respect to each of the bits constituting the equalized output sequence. Here, b$^i_t$ t denotes a t$^{th}$ bit of an i$^{th}$ transmitted signal sequence. The log-likelihood ratio calculating unit 141e outputs the calculated log-likelihood ratio L$_a$(b$^i_t$) to the deinterleaver 142e. The deinterleaver 142e rearranges the input log-likelihood ratio L$_a$(b$^i_t$) for each bit and outputs L$_a$(c$^i_t$). Here, c$^i_t$ is a binary sequence obtained by rearranging b$^i_t$. The deinterleaver 142e outputs the rearranged log-likelihood ratio L$_a$(c$^i_t$) to the error correction decoding unit 143e and the subtractor 147e.

The error correction decoding unit 143e calculates a posteriori log-likelihood ratio L$_p$(c$^i_t$) for each bit using an appropriate decoding method on the basis of an error correction code similar to the error correction code used in the optical signal transmitting apparatus side. Here, $c^i_t$ denotes a $t^{th}$ bit of an $i^{th}$ transmitted signal sequence. The error correction code in the present embodiment is not limited to a specific error correction code such as, for example, a Hamming code, a BCH code, an LDPC code, and a convolutional code, and any correction code may be used.

Next, the subtractor 147e subtracts $L_a(c^i_t)$, which is also an input to the error correction decoding unit 143e, from the posterior log-likelihood ratio $L_p(c^i_t)$ output from the error correction decoding unit 143e to thereby calculate an extrinsic log-likelihood ratio $L_e(c^i_t)$ as shown in the following formula.

$$L_e(c^i_t) = L_p(c^i_t) - L_a(c^i_t) \qquad (17)$$

The subtractor 147e outputs the extrinsic log-likelihood ratio $L_e(c^i_t)$ to the interleaver 144e. The interleaver 144e rearranges the extrinsic log-likelihood ratio $L_e(c^i_t)$ and outputs $L_e(b^i_t)$.

$L_e(b^i_t)$ is input to the soft decision symbol generating unit 146e. The soft decision symbol generating unit 146e generates a soft decision symbol sequence $\tilde{b}^i_t$ from the input $L_e(b^i_t)$. For example, when the transmitted signal sequence is subjected to binary phase shift keying (BPSK) modulation, the soft decision symbol generating unit 146e generates a soft decision symbol sequence in accordance with the following formula.

$$\tilde{b}^i_t = \tan h(b^i_t) \qquad (18)$$

Seventh Embodiment

Figure 15:
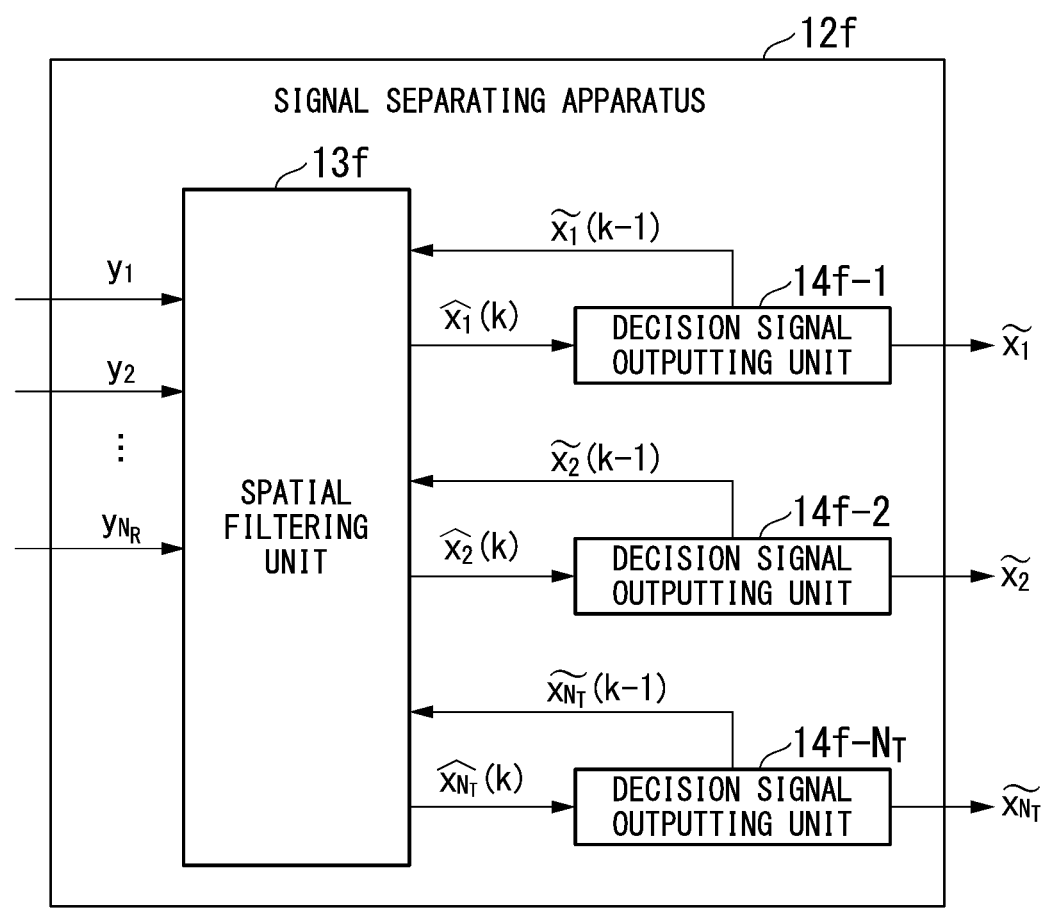
FIG. 15 is a schematic block diagram showing a functional configuration of a signal separating apparatus in an optical signal receiving apparatus of a seventh embodiment.

FIG. 15 is a schematic block diagram showing a functional configuration of a signal separating apparatus provided in an optical signal receiving apparatus in a seventh embodiment. A signal separating apparatus 12f of the present embodiment includes a spatial filtering unit 13f and decision signal outputting units 14f-1 to 14f-$N_T$. The spatial filtering unit 13f has a function similar to that of the spatial filtering unit described in the fifth embodiment or the spatial filtering unit described in the sixth embodiment. The decision signal outputting units 14f-1 to 14f-$N_T$ are the temporary decision signal outputting units or the soft decision signal outputting units in the above-described embodiments.

The signal separating apparatus 12f of the present embodiment is based on an iterative process and has a feedback structure.

Next, a signal detection process in the signal separating apparatus 12f of the present embodiment will be described. First, an upper limit value P of the number of times the signal detection process is iterated is set. Next, in the first signal detection process, received signal sequences y1 to y$N_R$ are input to the spatial filtering unit 13f. In this case, the spatial filtering unit 13f does not use signals fed back from the decision signal outputting units 14f-1 to 14f-N1. The spatial filtering unit 13f multiplies the received signal sequences y1 to y$N_R$ by weighting coefficients and outputs equalized output sequences x1^(1) to x$N_T$^(1). Here, the number in parentheses is the number of iterations (in this case, the number is "1" because of the first signal detection process). Next, the decision signal outputting units 14f-1 to 14f-$N_T$ input the equalized output sequences x1^(1) to x$N_T$^(1), respectively, decide the input equalized output sequences (i.e., the decision by the above-described temporary decision signal outputting units or soft decision signal outputting units), and output the obtained temporary decision signal sequences or soft decision signal sequences as decision signal sequences x1~(1) to x$N_T$~(1) to the spatial filtering unit 13f.

In the subsequent $k^{th}$ signal detection process, the received signal sequences y1 to y$N_R$ and the decision signal sequences x1~(k-1) to x$N_T$~(k-1) fed back from the decision signal outputting units 14f-1 to 14f-$N_T$ are input to the spatial filtering unit 13f. For example, in the second signal detection process (k=2), the received signal sequences y1 to y$N_R$ and the decision signal sequences x1~(1) to x$N_T$~(1) fed back from the decision signal outputting units 14f-1 to 14f-$N_T$ are input to the spatial filtering unit 13f. The spatial filtering unit 13f multiplies the received signal sequences y1 to y$N_R$ and the decision signal sequences x1~(k-1) to x$N_T$~(k-1) by weighting coefficients and outputs equalized output sequences x1^(k) to x$N_T$^(k). The decision signal outputting units 14f-1 to 14f-$N_T$ input the equalized output sequences x1^(k) to x$N_T$^(k), respectively, decide the input equalized output sequences, and provide feedback of obtained temporary decision signal sequences or soft decision signal sequences to the spatial filtering unit 13f.

When the above-described signal detection process is iterated until the signal detection process is performed for k=P, the signal separating apparatus 12f outputs decision signal sequences x1~ to x$N_T$~.

Figure 16:
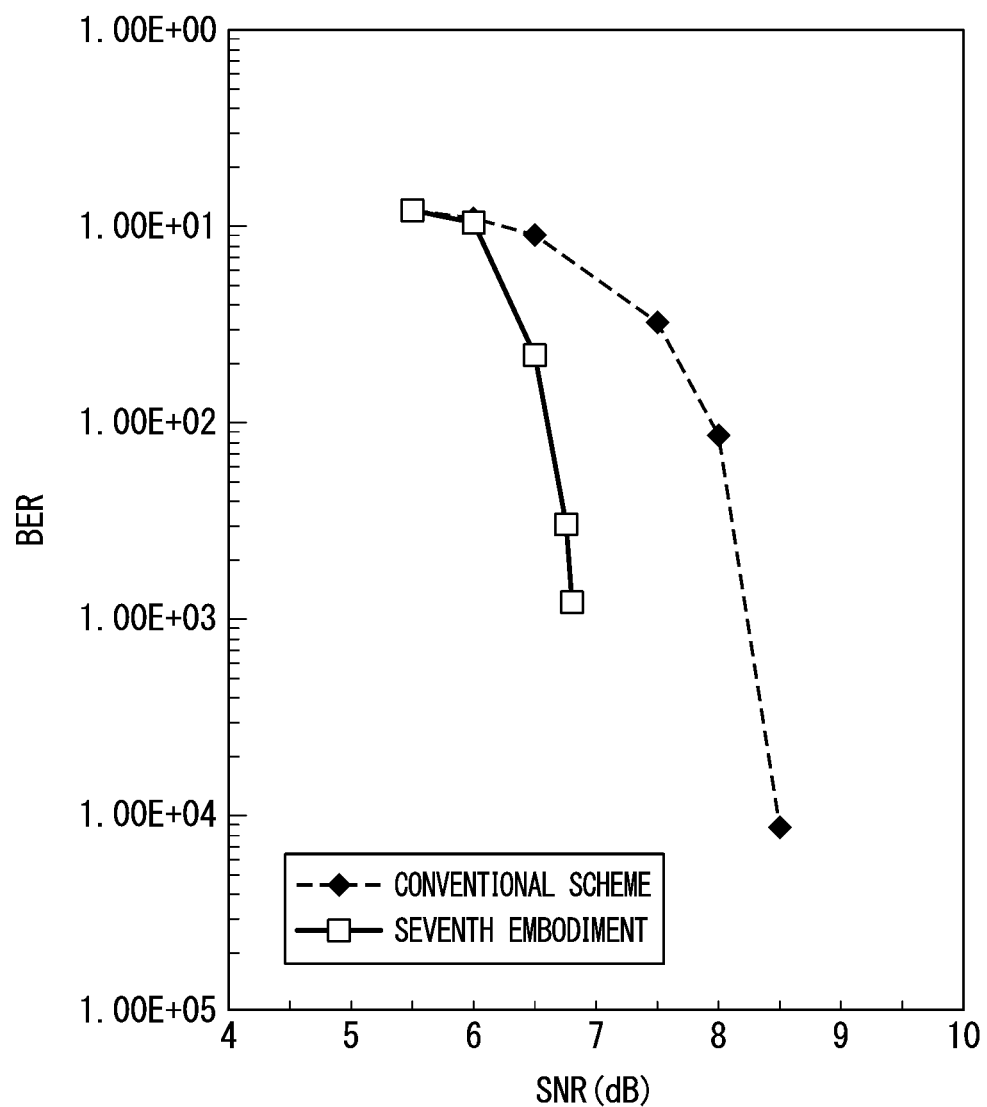
FIG. 16 is a diagram describing an advantageous effect of the seventh embodiment.
Figure 17:
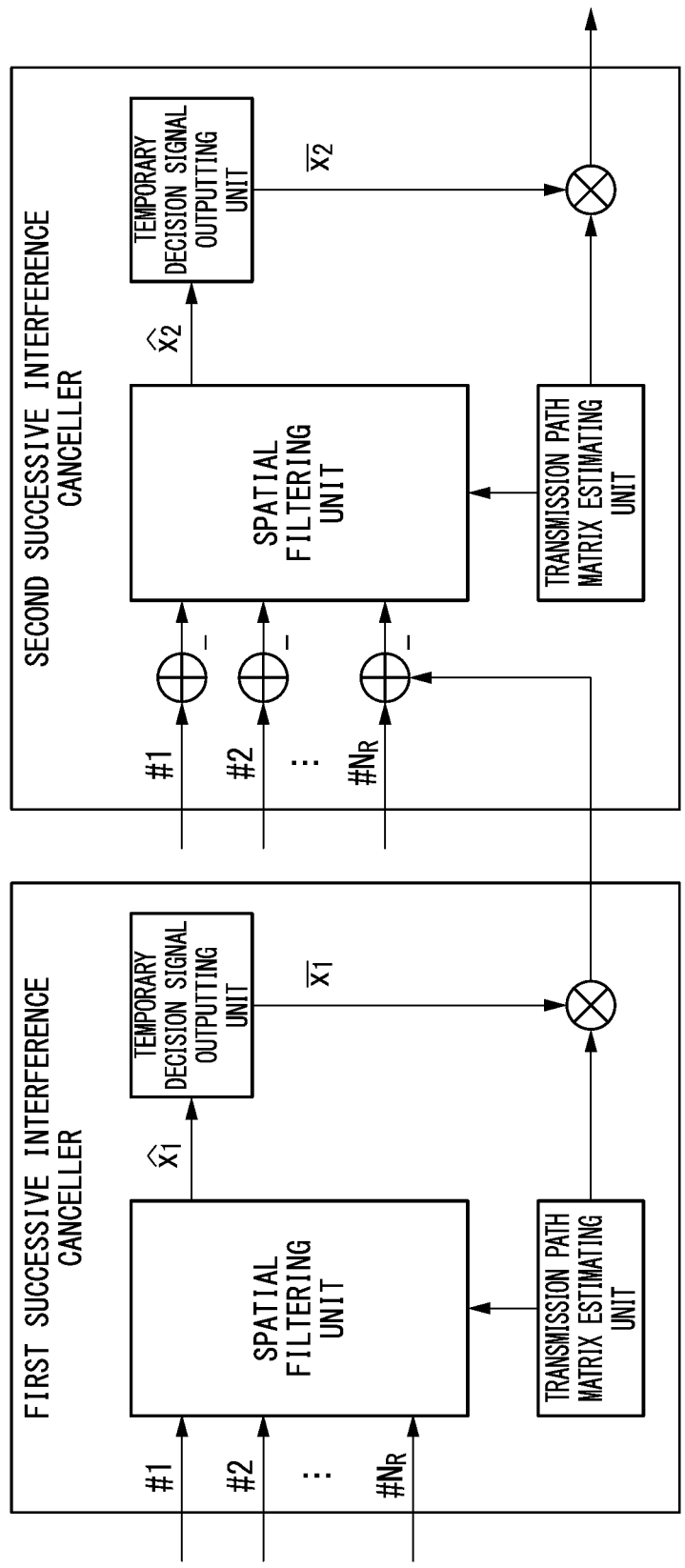
FIG. 17 is a diagram describing the background art.

FIG. 16 shows the result of simulation of the transmission for checking the advantageous effect of the seventh embodiment. In FIG. 16, a 2×2 MIMO system is assumed as a transmission path model. Independent QPSK signals were transmitted from two optical signal transmitting apparatuses and average bit error rates of both signals was recorded when a signal-to-noise ratio (SNR) was changed. FIG. 16 shows a result of comparing bit error rates of the conventional scheme and the seventh embodiment. It can be seen from FIG. 16 that about 1.5 dB was obtained as a gain of an SNR (i.e., the SNR gain) at a bit error rate of $10^{-2}$ by applying the seventh embodiment.

Although each of the above-described embodiments has described the case in which the optical signal receiving apparatuses mainly perform the processes in a time domain, the processes in the time domain in the optical signal receiving apparatus of each embodiment may be replaced with processes in a frequency domain.

The optical signal receiving apparatus in each of the above-described embodiments may be implemented on a communication system other than an optical communication system, such as a wireless communication system or a satellite communication system. Also, the present invention is not limited to the single carrier communication system described above, and the above-described embodiments may be applied to a multicarrier communication system such as orthogonal frequency division multiplexing (OFDM) and a code spreading communication system such as code division multiplexing access (CDMA).

As another example, the above-described optical signal receiving apparatuses may be implemented by a computer. In this case, the optical signal receiving apparatuses may be implemented by recording a program for realizing functions of these apparatuses on a computer-readable recording medium and causing a computer system to read and execute the program recorded on the recording medium. It is to be noted that the computer system described here is assumed to include an operating system (OS) and hardware such as peripheral devices. Also, the computer-readable recording medium refers to a storage apparatus including a portable medium such as a flexible disk, a magneto-optical disc, a read only memory (ROM), and a compact disc (CD)-ROM, and a hard disk embedded in the computer system.

Moreover, the computer-readable recording medium may include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system including a server and a client when the program is transmitted. Furthermore, the above-described program may be used to realize some of the above-described functions, and may realize the above-described functions in combination with a program already recorded on the computer system. Also, the optical signal receiving apparatuses may be realized using hardware such as a programmable logic device (PLD), a field programmable gate array (FPGA), or a digital signal processor (DSP).

Although the embodiments of the present invention have been described above in detail with reference to the drawings, specific configurations are not limited to the embodiments and other designs and the like that do not depart from the gist of the present invention may also be included.

INDUSTRIAL APPLICABILITY

The present invention can be applied to, for example, optical communication.

With the present invention, it is possible to separate multiplexed signals with high accuracy.

DESCRIPTION OF REFERENCE SIGNS

10 Optical signal receiving apparatus
11 Receiving unit
12 Signal separating apparatus
12-1, 12a-1, 12d-1 First signal separating apparatus
12-2, 12a-2 Second signal separating apparatus
12-k, 12b-k, 12d-k $k^{th}$ signal separating apparatus
12f Signal separating apparatus
13-1, 13-2, 13b-k, 13d-1, 13d-k, 13f Spatial filtering unit
131-k, 131d-k First multiplying unit
131a-k, 131da-k, 136d-k Multiplier
132-k, 132d-k Second multiplying unit
133-k, 133d-k Adder
134-k, 134d-k Phase correcting unit
135-k, 135d-k Coefficient multiplying unit
136-k Multiplier
137-k Calculator
14-1 to 14-2, 14a-1 to 14a-2, 14a-k, 14d-1-1 to 14d-1-$N_T$, 14d-k-1 to 14d-k-$N_T$ Temporary decision signal outputting unit
14e-1-1 to 14e-1-Ni, 14e-k-1 to 14e-k-$N_T$ Soft decision signal outputting unit
14f-1 to 14f-$N_T$ Decision signal outputting unit
141-1 to 141-2, 141e Log-likelihood ratio calculating unit
142-1 to 142-2, 142e Deinterleaver
143-1 to 143-2, 143e Error correction decoding unit
144-1 to 144-2, 144e Interleaver
145-1 to 145-2 Mapping circuit
146e Soft decision symbol generating unit
147e Subtractor
15-1, 15-2, 15b-k, 15c-k, 15d-k Weighting coefficient updating unit
16-k, 16d-k Phase noise estimating unit

The invention claimed is:

1. A signal receiving apparatus comprising:
a plurality of signal separating apparatuses that separate specific signals from a plurality of received signals,
wherein each of the plurality of signal separating apparatuses comprises:
a spatial filtering unit that separates a plurality of equalized signals; and
a decision signal outputting unit that generates a plurality of decision signals by deciding the plurality of equalized signals and outputs the generated plurality of decision signals,
the spatial filtering unit of a first signal separating apparatus separates a plurality of first equalized signals as the plurality of equalized signals by multiplying the plurality of received signals by first weighting coefficients,
the first signal separating apparatus further comprises a first weighting coefficient updating unit that updates the first weighting coefficients on the basis of the plurality of first equalized signals,
the spatial filtering unit of a $k^{th}$ (k is an integer greater than or equal to 2) signal separating apparatus separates a plurality of $k^{th}$ equalized signals as the plurality of equalized signals by multiplying the plurality of received signals and a plurality of $(k-1)^{th}$ decision signals output from a $(k-1)^{th}$ signal separating apparatus as the plurality of decision signals by $k^{th}$ weighting coefficients, and
the $k^{th}$ signal separating apparatus further comprises a $k^{th}$ weighting coefficient updating unit that updates the $k^{th}$ weighting coefficients on the basis of the plurality of $k^{th}$ equalized signals.

2. The signal receiving apparatus according to claim 1, wherein the decision signal outputting unit is a temporary decision signal outputting unit that generates a plurality of temporary decision signals representing a plurality of signals that are likely as the plurality of equalized signals, as the plurality of decision signals.

3. The signal receiving apparatus according to claim 1, wherein the decision signal outputting unit is a soft decision signal outputting unit that calculates likelihood information of transmitted signal information and generates soft decision symbols on the basis of the likelihood information as the plurality of decision signals.

4. The signal receiving apparatus according to claim 1, wherein the $k^{th}$ signal separating apparatus further comprises a phase noise estimating unit that estimates phase noise of the plurality of $k^{th}$ equalized signals on the basis of the plurality of $k^{th}$ equalized signals output by the spatial filtering unit and outputs the estimated phase noise, and
the spatial filtering unit of the $k^{th}$ signal separating apparatus comprises:
a phase correcting unit that multiplies the phase noise output from the phase noise estimating unit by the plurality of $(k-1)^{th}$ decision signals; and
a coefficient multiplying unit that multiplies the plurality of received signals and an output signal of the phase correcting unit by coefficients.

5. The signal receiving apparatus according to claim 2, wherein the $k^{th}$ signal separating apparatus further comprises a phase noise estimating unit that estimates phase noise of the plurality of $k^{th}$ equalized signals on the basis of the plurality of $k^{th}$ equalized signals output by the spatial filtering unit and outputs the estimated phase noise, and
the spatial filtering unit of the $k^{th}$ signal separating apparatus comprises:

a phase correcting unit that multiplies the phase noise output from the phase noise estimating unit by the plurality of $(k-1)^{th}$ decision signals; and a coefficient multiplying unit that multiplies the plurality of received signals and an output signal of the phase correcting unit by coefficients.

6. The signal receiving apparatus according to claim 3, wherein the $k^{th}$ signal separating apparatus further comprises a phase noise estimating unit that estimates phase noise of the plurality of $k^{th}$ equalized signals on the basis of the plurality of $k^{th}$ equalized signals output by the spatial filtering unit and outputs the estimated phase noise, and the spatial filtering unit of the $k^{th}$ signal separating apparatus comprises:

a phase correcting unit that multiplies the phase noise output from the phase noise estimating unit by the plurality of $(k-1)^{th}$ decision signals; and a coefficient multiplying unit that multiplies the plurality of received signals and an output signal of the phase correcting unit by coefficients.

7. A signal separating method comprising:

a spatial filtering step in which each of a plurality of signal separating apparatuses that separate specific signals from a plurality of received signals separates a plurality of equalized signals; and a decision signal outputting step of generating a plurality of decision signals by deciding the plurality of equalized signals and outputting the generated plurality of decision signals, wherein in the spatial filtering step, a first signal separating apparatus separates a plurality of first equalized signals as the plurality of equalized signals by multiplying the plurality of received signals by first weighting coefficients and a $k^{th}$ (k is an integer greater than or equal to 2) signal separating apparatus separates a plurality of $k^{th}$ equalized signals as the plurality of equalized signals by multiplying the plurality of received signals and a plurality of $(k-1)^{th}$ decision signals output from a $(k-1)^{th}$ signal separating apparatus as the plurality of decision signals by $k^{th}$ weighting coefficients, and the signal separating method further comprises a weighting coefficient updating step in which the first signal separating apparatus updates the first weighting coefficients on the basis of the plurality of first equalized signals and the $k^{th}$ signal separating apparatus updates the $k^{th}$ weighting coefficients on the basis of the plurality of $k^{th}$ equalized signals.

* * * * *